United States Patent
Azizi et al.

(10) Patent No.: US 10,177,888 B2
(45) Date of Patent: *Jan. 8, 2019

(54) WIRELESS APPARATUS FOR HIGH-EFFICIENCY (HE) COMMUNICATION WITH ADDITIONAL SUBCARRIERS

(71) Applicant: Intel IP Corporation, Santa Clara, CA (US)

(72) Inventors: Shahrnaz Azizi, Cupertino, CA (US); Eldad Perahia, Portland, OR (US); Thomas J. Kenney, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 15/263,864

(22) Filed: Sep. 13, 2016

(65) Prior Publication Data

US 2017/0135035 A1    May 11, 2017

Related U.S. Application Data

(63) Continuation of application No. 15/052,600, filed on Feb. 24, 2016, now Pat. No. 9,450,725, which is a
(Continued)

(51) Int. Cl.
*H04L 5/00* (2006.01)
*H04L 27/26* (2006.01)
(Continued)

(52) U.S. Cl.
CPC ......... *H04L 5/0048* (2013.01); *H04B 7/0413* (2013.01); *H04B 7/2615* (2013.01);
(Continued)

(58) Field of Classification Search
CPC ............... H04L 27/2602; H04L 27/261; H04L 27/2611; H04L 27/2655
See application file for complete search history.

(56) References Cited

U.S. PATENT DOCUMENTS

| 7,466,964 B2 | 12/2008 | Sondur |
| 7,809,020 B2 | 10/2010 | Douglas et al. |

(Continued)

FOREIGN PATENT DOCUMENTS

| CN | 101433018 A | 5/2009 |
| CN | 103703711 A | 4/2014 |

(Continued)

OTHER PUBLICATIONS

Author Unknown, IEEE Standard 802.11b-1999, pp. 1-89, 1999.*
(Continued)

*Primary Examiner* — Christopher M Crutchfield
(74) *Attorney, Agent, or Firm* — Schwegman Lundberg & Woessner, P.A.

(57) ABSTRACT

Embodiments of an access point and method for high-efficiency WLAN (HEW) communication are generally described herein. In some embodiments, the access point may be configured to operate as a master station and may configure an HEW frame to include a legacy signal field (L-SIG), an HEW signal field (HEW SIG-A) following the L-SIG, and one or more HEW fields following the HEW SIG-A. The L-SIG may be configured for transmission using a legacy number of data subcarriers, a legacy number of pilot subcarriers and a number of additional reference subcarriers modulated with a known reference sequence. At least one symbol of the HEW SIG-A and the one or more HEW fields following the HEW SIG-A of the HEW frame may be configured for transmission using additional data subcarriers. The additional data subcarriers may correspond to the additional reference subcarriers of the L-SIG.

20 Claims, 4 Drawing Sheets

| FIELD | N TONE AS A FUNCTION OF BANDWIDTH IN FIELD PER FREQUENCY SEGMENT | | | | GUARD INTERVAL DURATION |
|---|---|---|---|---|---|
| | 20 MHz | 40 MHz | 80 MHz | 160 MHz | |
| 202— L-STF | 12 | 24 | 48 | 96 | - |
| 204— L-LTF | 52 | 104 | 208 | 416 | $T_{GI2}$ |
| 406— L-SIG | 56 | 114 | 242 | 484 | $T_{GI}$ |
| 408— HEW-SIG-A | 56 | 114 | 242 | 484 | $T_{GI}$ |
| HEW-STF | 12 | 24 | 48 | 96 | - |
| 410— HEW-LTFs | 56 | 114 | 242 | 484 | $T_{GI}$ |
| 412— HEW-SIG-B | 56 | 114 | 242 | 484 | $T_{GI}$ |
| 414— HEW-SCH | 56 | 114 | 242 | 484 | $T_{GI}$ OR $T_{GI2}$ |
| 416— HEW-DATA | 56 | 114 | 242 | 484 | |

Related U.S. Application Data continuation of application No. 14/338,137, filed on Jul. 22, 2014, now Pat. No. 9,325,463.

(60) Provisional application No. 61/906,059, filed on Nov. 19, 2013, provisional application No. 61/973,376, filed on Apr. 1, 2014, provisional application No. 61/976,951, filed on Apr. 8, 2014, provisional application No. 61/986,256, filed on Apr. 30, 2014, provisional application No. 61/986,250, filed on Apr. 30, 2014, provisional application No. 61/991,730, filed on May 12, 2014, provisional application No. 62/013,869, filed on Jun. 18, 2014, provisional application No. 62/024,801, filed on Jul. 15, 2014.

(51) Int. Cl.

| | | |
|---|---|---|
| H04L 1/00 | (2006.01) | |
| H04L 27/34 | (2006.01) | |
| H04W 52/02 | (2009.01) | |
| H04W 74/04 | (2009.01) | |
| H04W 74/02 | (2009.01) | |
| H04W 84/12 | (2009.01) | |
| H04B 7/26 | (2006.01) | |
| H04W 52/24 | (2009.01) | |
| H04W 72/04 | (2009.01) | |
| H04W 74/08 | (2009.01) | |
| H04B 7/0413 | (2017.01) | |
| H04W 88/10 | (2009.01) | |
| H04W 88/08 | (2009.01) | |

(52) U.S. Cl.
CPC ............ *H04L 1/0071* (2013.01); *H04L 5/001* (2013.01); *H04L 5/0007* (2013.01); *H04L 5/0035* (2013.01); *H04L 5/0037* (2013.01); *H04L 5/0053* (2013.01); *H04L 5/0094* (2013.01); *H04L 27/261* (2013.01); *H04L 27/2602* (2013.01); *H04L 27/3405* (2013.01); *H04L 27/3483* (2013.01); *H04W 52/0206* (2013.01); *H04W 52/244* (2013.01); *H04W 72/042* (2013.01); *H04W 72/0406* (2013.01); *H04W 72/0426* (2013.01); *H04W 72/0453* (2013.01); *H04W 72/0473* (2013.01); *H04W 74/02* (2013.01); *H04W 74/04* (2013.01); *H04W 74/08* (2013.01); *H04L 5/003* (2013.01); *H04L 5/0098* (2013.01); *H04W 74/0808* (2013.01); *H04W 84/12* (2013.01); *H04W 88/08* (2013.01); *H04W 88/10* (2013.01); *Y02D 70/00* (2018.01); *Y02D 70/122* (2018.01); *Y02D 70/1262* (2018.01); *Y02D 70/142* (2018.01); *Y02D 70/449* (2018.01)

(56) References Cited

U.S. PATENT DOCUMENTS

| | | | |
|---|---|---|---|
| 8,395,997 | B2 | 3/2013 | Banerjea et al. |
| 8,509,323 | B2 | 8/2013 | Nangia et al. |
| 8,948,064 | B2 | 2/2015 | Shahar |
| 8,989,158 | B2 | 3/2015 | Seok |
| 9,160,503 | B2 | 10/2015 | Kim et al. |
| 9,271,241 | B2 | 2/2016 | Kenney et al. |
| 9,325,463 | B2 | 4/2016 | Azizi et al. |
| 9,450,725 | B2 | 9/2016 | Azizi et al. |
| 9,462,504 | B2 | 10/2016 | Stephens et al. |
| 9,838,961 | B2 | 12/2017 | Kenney et al. |
| 9,853,784 | B2 | 12/2017 | Azizi et al. |
| 9,867,210 | B2 | 1/2018 | Azizi |
| 9,882,695 | B2 | 1/2018 | Azizi et al. |
| 2004/0054820 | A1 | 3/2004 | Karaoguz et al. |
| 2004/0146117 | A1 | 7/2004 | Subramaniam et al. |
| 2005/0015703 | A1 | 1/2005 | Terry et al. |
| 2005/0063336 | A1 | 3/2005 | Kim et al. |
| 2005/0135410 | A1 | 6/2005 | Stephens |
| 2005/0276347 | A1 | 12/2005 | Mujtaba et al. |
| 2006/0018249 | A1 | 1/2006 | Shearer et al. |
| 2006/0030322 | A1 | 2/2006 | Kim et al. |
| 2006/0062314 | A1 | 3/2006 | Palin et al. |
| 2006/0067415 | A1 | 3/2006 | Mujtaba |
| 2006/0105764 | A1 | 5/2006 | Krishnaswamy et al. |
| 2006/0153060 | A1 | 7/2006 | Cho |
| 2007/0014375 | A1 | 1/2007 | Nakao |
| 2007/0042715 | A1 | 2/2007 | Salo et al. |
| 2007/0060161 | A1 | 3/2007 | Chindapol et al. |
| 2007/0147226 | A1 | 6/2007 | Khandekar et al. |
| 2007/0147521 | A1 | 6/2007 | Horng et al. |
| 2007/0153929 | A1 | 7/2007 | Ballentin et al. |
| 2007/0202816 | A1 | 8/2007 | Zheng |
| 2007/0207742 | A1 | 9/2007 | Kim et al. |
| 2007/0242600 | A1 | 10/2007 | Li et al. |
| 2008/0013496 | A1 | 1/2008 | Dalmases et al. |
| 2008/0049851 | A1 | 2/2008 | Nangia et al. |
| 2008/0188232 | A1 | 8/2008 | Park et al. |
| 2008/0232339 | A1 | 9/2008 | Yang et al. |
| 2008/0240018 | A1 | 10/2008 | Xue et al. |
| 2008/0240275 | A1 | 10/2008 | Cai |
| 2009/0007185 | A1 | 1/2009 | Nix et al. |
| 2009/0122882 | A1 | 5/2009 | Mujtaba |
| 2009/0270109 | A1 | 10/2009 | Wang Helmersson et al. |
| 2009/0310692 | A1 | 12/2009 | Kafle et al. |
| 2010/0046671 | A1 | 2/2010 | Ali et al. |
| 2010/0067480 | A1 | 3/2010 | Wang et al. |
| 2010/0080312 | A1 | 4/2010 | Moffatt et al. |
| 2010/0091673 | A1 | 4/2010 | Sawai et al. |
| 2010/0098181 | A1 | 4/2010 | Jacobsen et al. |
| 2010/0107042 | A1 | 4/2010 | Sawai et al. |
| 2010/0110804 | A1 | 5/2010 | Yeh |
| 2010/0157956 | A1 | 6/2010 | Takahashi |
| 2010/0157970 | A1 | 6/2010 | Gotman et al. |
| 2010/0172316 | A1 | 7/2010 | Hwang et al. |
| 2010/0220679 | A1 | 9/2010 | Abraham et al. |
| 2010/0246375 | A1 | 9/2010 | Orlik et al. |
| 2010/0246539 | A1 | 9/2010 | Guillouard et al. |
| 2010/0260159 | A1 | 10/2010 | Zhang et al. |
| 2010/0309834 | A1 | 12/2010 | Fischer et al. |
| 2010/0322166 | A1 | 12/2010 | Sampath et al. |
| 2011/0002219 | A1 | 1/2011 | Kim et al. |
| 2011/0013608 | A1 | 1/2011 | Lee et al. |
| 2011/0026623 | A1 | 2/2011 | Srinivasa et al. |
| 2011/0032850 | A1 | 2/2011 | Cai |
| 2011/0038441 | A1 | 2/2011 | Shi |
| 2011/0063991 | A1 | 3/2011 | Sampath et al. |
| 2011/0075625 | A1 | 3/2011 | Nyström et al. |
| 2011/0085513 | A1 | 4/2011 | Chen et al. |
| 2011/0096685 | A1 | 4/2011 | Lee et al. |
| 2011/0110454 | A1 | 5/2011 | Sampath et al. |
| 2011/0116401 | A1 | 5/2011 | Banerjea et al. |
| 2011/0188598 | A1 | 8/2011 | Lee et al. |
| 2011/0194544 | A1 | 8/2011 | Yang et al. |
| 2011/0206156 | A1 | 8/2011 | Lee et al. |
| 2011/0222486 | A1 | 9/2011 | Hart |
| 2011/0235593 | A1 | 9/2011 | Gong et al. |
| 2011/0243025 | A1 | 10/2011 | Kim et al. |
| 2011/0249660 | A1 | 10/2011 | Noh et al. |
| 2011/0261708 | A1 | 10/2011 | Grandhi |
| 2011/0261769 | A1 | 10/2011 | Ji et al. |
| 2011/0268094 | A1 | 11/2011 | Gong et al. |
| 2011/0299474 | A1 | 12/2011 | Li et al. |
| 2011/0305296 | A1 | 12/2011 | Van Nee |
| 2012/0002756 | A1 | 1/2012 | Zhang et al. |
| 2012/0063433 | A1 | 3/2012 | Wentink |
| 2012/0106481 | A1 | 5/2012 | Cho et al. |
| 2012/0127940 | A1 | 5/2012 | Lee et al. |
| 2012/0155424 | A1 | 6/2012 | Kim et al. |
| 2012/0155444 | A1 | 6/2012 | Chiueh et al. |
| 2012/0170563 | A1 | 7/2012 | Abraham et al. |
| 2012/0201213 | A1 | 8/2012 | Banerjea et al. |
| 2012/0218983 | A1 | 8/2012 | Noh et al. |

(56) References Cited

U.S. PATENT DOCUMENTS

| | | |
|---|---|---|
| 2012/0243485 A1 | 9/2012 | Merlin et al. |
| 2012/0269124 A1 | 10/2012 | Porat |
| 2012/0275446 A1 | 11/2012 | Stacey et al. |
| 2012/0314697 A1 | 12/2012 | Noh et al. |
| 2012/0320890 A1 | 12/2012 | Zhang et al. |
| 2012/0324315 A1 | 12/2012 | Zhang et al. |
| 2012/0327915 A1 | 12/2012 | Kang et al. |
| 2013/0070642 A1 | 3/2013 | Kim et al. |
| 2013/0136075 A1 | 5/2013 | Yu et al. |
| 2013/0142155 A1 | 6/2013 | Trainin et al. |
| 2013/0177090 A1 | 7/2013 | Yang et al. |
| 2013/0188567 A1 | 7/2013 | Wang et al. |
| 2013/0215993 A1 | 8/2013 | Taghavi Nasrabadi et al. |
| 2013/0229996 A1 | 9/2013 | Wang et al. |
| 2013/0230035 A1 | 9/2013 | Grandhi et al. |
| 2013/0235720 A1 | 9/2013 | Wang et al. |
| 2013/0258975 A1 | 10/2013 | Krishnamurthy et al. |
| 2013/0265907 A1 | 10/2013 | Kim et al. |
| 2013/0286925 A1 | 10/2013 | Fischer et al. |
| 2013/0286959 A1 | 10/2013 | Lou et al. |
| 2013/0301551 A1 | 11/2013 | Ghosh et al. |
| 2013/0301563 A1 | 11/2013 | Gupta et al. |
| 2014/0010196 A1 | 1/2014 | Shapira |
| 2014/0016607 A1 | 1/2014 | Hart |
| 2014/0112274 A1 | 4/2014 | Moon et al. |
| 2014/0169245 A1 | 6/2014 | Kenney et al. |
| 2014/0169356 A1 | 6/2014 | Noh et al. |
| 2014/0205029 A1 | 7/2014 | Srinivasa et al. |
| 2014/0211775 A1 | 7/2014 | Sampath et al. |
| 2014/0269544 A1 | 9/2014 | Zhu et al. |
| 2014/0307650 A1 | 10/2014 | Vermani et al. |
| 2014/0369276 A1 | 12/2014 | Porat et al. |
| 2015/0063255 A1 | 3/2015 | Tandra et al. |
| 2015/0063318 A1 | 3/2015 | Merlin et al. |
| 2015/0085836 A1 | 3/2015 | Kang et al. |
| 2015/0117428 A1 | 4/2015 | Lee et al. |
| 2015/0124690 A1 | 5/2015 | Merlin et al. |
| 2015/0131517 A1 | 5/2015 | Chu et al. |
| 2015/0131756 A1 | 5/2015 | Suh et al. |
| 2015/0139090 A1 | 5/2015 | Stephens et al. |
| 2015/0139091 A1 | 5/2015 | Azizi et al. |
| 2015/0139118 A1 | 5/2015 | Azizi et al. |
| 2015/0139119 A1 | 5/2015 | Azizi et al. |
| 2015/0139205 A1 | 5/2015 | Kenney et al. |
| 2015/0139206 A1 | 5/2015 | Azizi et al. |
| 2015/0146808 A1 | 5/2015 | Chu et al. |
| 2015/0208394 A1 | 7/2015 | Seo et al. |
| 2015/0237531 A1 | 8/2015 | Hao et al. |
| 2015/0288489 A1 | 10/2015 | Azizi et al. |
| 2015/0326351 A1 | 11/2015 | Kim et al. |
| 2015/0326408 A1 | 11/2015 | Vermani et al. |
| 2015/0327121 A1 | 11/2015 | Li et al. |
| 2016/0020885 A1 | 1/2016 | Li et al. |
| 2016/0112899 A1 | 4/2016 | Kenney et al. |
| 2016/0211944 A1 | 7/2016 | Kenney et al. |
| 2016/0211961 A1 | 7/2016 | Azizi et al. |
| 2016/0227572 A1 | 8/2016 | Li et al. |
| 2016/0241366 A1 | 8/2016 | Azizi et al. |
| 2016/0242173 A1 | 8/2016 | Li et al. |

FOREIGN PATENT DOCUMENTS

| | | |
|---|---|---|
| CN | 105379217 A | 3/2016 |
| CN | 105637968 A | 6/2016 |
| CN | 105659656 A | 6/2016 |
| CN | 105659681 A | 6/2016 |
| CN | 105706407 A | 6/2016 |
| CN | 105900511 A | 8/2016 |
| CN | 105917611 A | 8/2016 |
| CN | 106100807 A | 11/2016 |
| CN | 106105080 A | 11/2016 |
| CN | 106899385 A | 6/2017 |
| EP | 2362580 A2 | 8/2011 |
| EP | 2499872 A1 | 9/2012 |
| EP | 3072254 A1 | 9/2016 |
| EP | 3072255 A1 | 9/2016 |
| EP | 3072270 A1 | 9/2016 |
| EP | 3072324 A1 | 9/2016 |
| EP | 3072344 A1 | 9/2016 |
| EP | 3072345 A1 | 9/2016 |
| EP | 3072347 A1 | 9/2016 |
| JP | 2007074689 A | 3/2007 |
| KR | 1020110044938 A | 5/2011 |
| KR | 1020120127676 A | 11/2012 |
| TW | 200539601 A | 12/2005 |
| TW | 201044815 A | 12/2010 |
| TW | 201141288 A | 11/2011 |
| TW | 201141288 A1 | 11/2011 |
| TW | 201234880 A | 8/2012 |
| TW | 201251382 A | 12/2012 |
| TW | 201301827 A | 1/2013 |
| TW | 201306533 A | 2/2013 |
| TW | 201322786 A | 6/2013 |
| TW | 201322786 A1 | 6/2013 |
| TW | 201349815 A | 12/2013 |
| TW | 201406107 A | 2/2014 |
| TW | 201534073 A | 9/2015 |
| TW | 201534074 A | 9/2015 |
| TW | 201538023 A | 10/2015 |
| TW | 201540029 A | 10/2015 |
| TW | 201540118 A | 10/2015 |
| TW | 201541889 A | 11/2015 |
| TW | 201541890 A | 11/2015 |
| TW | 201547248 A | 12/2015 |
| TW | 201547313 A | 12/2015 |
| TW | 201605191 A | 2/2016 |
| TW | 201605271 A | 2/2016 |
| TW | 201608863 A | 3/2016 |
| TW | 201622458 A | 6/2016 |
| TW | 201632022 A | 9/2016 |
| TW | I572173 B | 2/2017 |
| TW | I573413 B | 3/2017 |
| TW | I578838 B | 4/2017 |
| TW | I586120 B | 6/2017 |
| WO | WO-2005053198 A2 | 6/2005 |
| WO | WO-2008118429 A1 | 10/2008 |
| WO | WO-2011025146 A2 | 3/2011 |
| WO | WO-2011068387 A2 | 6/2011 |
| WO | WO-2011153507 A2 | 12/2011 |
| WO | WO-2012057547 A2 | 5/2012 |
| WO | WO-2012106635 A1 | 8/2012 |
| WO | WO-2013055117 A2 | 4/2013 |
| WO | WO-2013058512 A1 | 4/2013 |
| WO | WO-2013077653 A1 | 5/2013 |
| WO | WO-2013089404 A1 | 6/2013 |
| WO | WO-2013191609 A1 | 12/2013 |
| WO | WO-2014066785 A1 | 5/2014 |
| WO | WO-2015031323 A1 | 3/2015 |
| WO | WO-2015076917 A1 | 5/2015 |
| WO | WO-2015076923 A1 | 5/2015 |
| WO | WO-2015076932 A1 | 5/2015 |
| WO | WO-2015077040 A1 | 5/2015 |
| WO | WO-2015077040 A8 | 5/2015 |
| WO | WO-2015077042 A1 | 5/2015 |
| WO | WO-2015077049 A1 | 5/2015 |
| WO | WO-2015077056 A1 | 5/2015 |
| WO | WO-2015077068 A1 | 5/2015 |
| WO | WO-2015077096 A1 | 5/2015 |
| WO | WO-2015077223 A1 | 5/2015 |
| WO | WO-2015127777 A1 | 9/2015 |
| WO | WO-2015130335 A1 | 9/2015 |
| WO | WO-2015130341 A1 | 9/2015 |
| WO | WO-2015171243 A1 | 11/2015 |
| WO | WO-2015195460 A1 | 12/2015 |
| WO | WO-2016010578 A1 | 1/2016 |
| WO | WO-2016010651 A1 | 1/2016 |

OTHER PUBLICATIONS

"U.S. Appl. No. 14/341,055, Non Final Office Action dated Nov. 14, 2016", 10 pgs.

"U.S. Appl. No. 14/447,254, Final Office Action dated Sep. 14, 2016", 13 pgs.

(56) References Cited

OTHER PUBLICATIONS

"U.S. Appl. No. 14/573,912, Notice of Allowability dated Dec. 9, 2016", 2 pgs.
"U.S. Appl. No. 14/573,912, Notice of Allowance dated Nov. 3, 2016", 7 pgs.
"U.S. Appl. No. 14/573,912, Response dated Oct. 17, 2016 to Non Final Office Action dated Jun. 16, 2016", 11 pgs.
"U.S. Appl. No. 14/977,405, Notice of Allowance dated Nov. 18, 2016", 8 pgs.
"U.S. Appl. No. 14/977,405, Response dated Oct. 24, 2016 to Final Office Action dated Aug. 24, 2016", 11 pgs.
"Indian Application Serial No. 201647013653, Preliminary Amendment dated Aug. 8, 2016", W/ English Translation, 18 pgs.
"Taiwanese Application Serial No. 104106275, Response dated Sep. 6, 2016 to Office Action dated Jun. 8, 2016", W/ English Claims, 80 pgs.
"Taiwanese Application Serial No. 104113863, Response filed Aug. 30, 2016 to Office Action dated Jun. 6, 2016", W/ English Claims, 76 pgs.
11ah Preamble for 2Mhz and Beyond, IEEE Submission No. IEEE 802.1-11/1483r2, 1-24.
"(Discussion on potential techniques for HEW", IEEE 802.11-13/0871 rO), (Jul. 15, 2013), 13 pgs.
"U.S. Appl. No. 14/304,041, Notice of Allowance dated Oct. 8, 2015", 8 pgs.
"U.S. Appl. No. 14/304,041, Supplemental Notice of Allowability dated Nov. 4, 2015", 5 pgs.
"U.S. Appl. No. 14/315,562, Examiner Interview Summary dated Jun. 20, 2016", 2 pgs.
"U.S. Appl. No. 14/315,562, Final Office Action dated Mar. 21, 2016", 16 pgs.
"U.S. Appl. No. 14/315,562, Non Final Office Action dated Sep. 25, 2015", 14 pgs.
"U.S. Appl. No. 14/315,562, Notice of Allowability dated Jun. 20, 2016", 7 pgs.
"U.S. Appl. No. 14/315,562, Notice of Allowance dated Jun. 6, 2016", 12 pgs.
"U.S. Appl. No. 14/315,562, Response dated May 16, 2016 to Final Office Action dated Mar. 21, 2016", 10 pgs.
"U.S. Appl. No. 14/315,562, Response dated Dec. 28, 2015 to Non Final Office Action dated Sep. 25, 2015", 9 pgs.
"U.S. Appl. No. 14/338,137, Corrected Notice of Allowance dated Jan. 22, 2016", 10 pgs.
"U.S. Appl. No. 14/338,137, Notice of Allowance dated Nov. 25, 2015", 14 pgs.
"U.S. Appl. No. 14/447,254, Examiner Interview Summary dated Jul. 22, 2016", 4 pgs.
"U.S. Appl. No. 14/447,254, Non Final Office Action dated Mar. 31, 2016", 13 pgs.
"U.S. Appl. No. 14/447,254, Response dated Aug. 1, 2016 to Non Final Office Action dated Mar. 31, 2016", 12 pgs.
"U.S. Appl. No. 14/458,000, Final Office Action dated May 9, 2016", 11 pgs.
"U.S. Appl. No. 14/458,000, Non Final Office Action dated Dec. 3, 2015", 16 pgs.
"U.S. Appl. No. 14/458,000, Notice of Allowance dated Aug. 24, 2016", 11 pgs.
"U.S. Appl. No. 14/458,000, Response dated Mar. 3, 2015 to Non Final Office Action dated Dec. 3, 2015", 15 pgs.
"U.S. Appl. No. 14/458,000, Response dated Aug. 8, 2016 to Final Office Action dated May 9, 2016", 12 pgs.
"U.S. Appl. No. 14/459,385, Response dated May 4, 2016 to Non Final Office Action dated Jan. 14, 2016", 9 pgs.
"U.S. Appl. No. 14/498,385, Final Office Action dated Aug. 11, 2016", 20 pgs.
"U.S. Appl. No. 14/498,385, Non Final Office Action dated Jan. 14, 2016", 19 pgs.
"U.S. Appl. No. 14/563,406, Examiner Interview Summary dated Jul. 26, 2016", 3 pgs.
"U.S. Appl. No. 14/563,406, Final Office Action dated Aug. 9, 2016", 15 pgs.
"U.S. Appl. No. 14/563,406, Non Final Office Action dated Apr. 26, 2016", 12 pgs.
"U.S. Appl. No. 14/563,406, Response dated Jul. 26, 2016 to Non Final Office Action dated Apr. 26, 2016", 9 pgs.
"U.S. Appl. No. 14/573,912, Non Final Office Action dated Jun. 16, 2016", 7 pgs.
"U.S. Appl. No. 14/977,405, Examiner Interview Summary dated Jul. 25, 2016", 3 pgs.
"U.S. Appl. No. 14/977,405, Final Office Action dated Aug. 24, 2016", 8 pgs.
"U.S. Appl. No. 14/977,405, Non Final Office Action dated Feb. 26, 2016", 7 pgs.
"U.S. Appl. No. 14/977,405, Preliminary Amendment dated Dec. 22, 2015", 11 pgs.
"U.S. Appl. No. 14/977,405, Response dated Jul. 20, 2016 to Non Final Office Action dated Feb. 26, 2016", 11 pgs.
"U.S. Appl. No. 15/052,600, Corrected Notice of Allowance dated Jun. 24, 2016", 7 pgs.
"U.S. Appl. No. 15/052,600, Corrected Notice of Allowance dated Aug. 5, 2016", 7 pgs.
"U.S. Appl. No. 15/052,600, Notice of Allowance dated May 20, 2016", 10 pgs.
"U.S. Appl. No. 15/052,600, Preliminary Amendment dated Apr. 1, 2016", 10 pgs.
"European Application Serial No. 16168650.6, Extended European Search Report dated Sep. 7, 2016", 12 pgs.
"Guard interval estimation considering switch time and propagation delay", R1-134362, 3GPP TSG RAN WG1 Meeting #74bis, (Oct. 2013).
"Indian Application Serial No. 201647013626, Voluntary Amendment dated Aug. 4, 2016", 15 pgs.
"International Application Serial No. PCT/CN2014/086532, International Search Report dated Dec. 17, 2014", 4 pgs.
"International Application Serial No. PCT/CN2014/086532, Written Opinion dated Dec. 17, 2014", 4 pgs.
"International Application Serial No. PCT/US2014/044881, International Search Report dated Nov. 24, 2014", 3 pgs.
"International Application Serial No. PCT/US2014/044881, Written Opinion dated Nov. 24, 2014", 7 pgs.
"International Application Serial No. PCT/US2014/053451, International Search Report dated Dec. 10, 2014", 3 pgs.
"International Application Serial No. PCT/US2014/053451, Written Opinion dated Dec. 10, 2014", 4 pgs.
"International Application Serial No. PCT/US2014/055996, International Preliminary Report on Patentability dated Jun. 2, 2016", 7 pgs.
"International Application Serial No. PCT/US2014/055996, International Search Report dated Dec. 17, 2014", 3 pgs.
"International Application Serial No. PCT/US2014/055996, Written Opinion dated Dec. 17, 2014", 5 pgs.
"International Application Serial No. PCT/US2014/056819, International Preliminary Report on Patentability dated Jun. 2, 2016", 8 pgs.
"International Application Serial No. PCT/US2014/056819, International Search Report dated Dec. 31, 2014", 3 pgs.
"International Application Serial No. PCT/US2014/056819, Written Opinion dated Dec. 31, 2014", 6 Pgs.
"International Application Serial No. PCT/US2014/057751, International Preliminary Report on Patentability dated Jun. 2, 2016", 7 pgs.
"International Application Serial No. PCT/US2014/057751, International Search Report dated Jan. 5, 2015", 3 pgs.
"International Application Serial No. PCT/US2014/057751, Written Opinion dated Jan. 5, 2015", 5 pgs.
"International Application Serial No. PCT/US2014/064340, International Preliminary Report on Patentability dated Jun. 2, 2016", 8 pgs.
"International Application Serial No. PCT/US2014/064340, International Search Report dated Feb. 16, 2015", 3 pgs.
"International Application Serial No. PCT/US2014/064340, Written Opinion dated Feb. 16, 2015", 6 pgs.

(56) References Cited

OTHER PUBLICATIONS

"International Application Serial No. PCT/US2014/064350, International Preliminary Report on Patentability dated Jun. 2, 2016", 7 pgs.
"International Application Serial No. PCT/US2014/064350, International Search Report dated Feb. 6, 2015", 4 pgs.
"International Application Serial No. PCT/US2014/064350, Written Opinion dated Feb. 6, 2015", 5 pgs.
"International Application Serial No. PCT/US2014/064509, International Preliminary Report on Patentability dated Jun. 2, 2016", 10 pgs.
"International Application Serial No. PCT/US2014/064509, International Search Report dated Feb. 11, 2015", 3 pgs.
"International Application Serial No. PCT/US2014/064509, Written Opinion dated Feb. 11, 2015", 8 pgs.
"International Application Serial No. PCT/US2014/064599, International Preliminary Report on Patentability dated Jun. 2, 2016", 9 pgs.
"International Application Serial No. PCT/US2014/064599, International Search Report dated Feb. 26, 2015", 3 pgs.
"International Application Serial No. PCT/US2014/064599, Written Opinion dated Feb. 26, 2015", 7 pgs.
"International Application Serial No. PCT/US2014/064767, International Preliminary Report on Patentability dated Jun. 2, 2016", 10 pgs.
"International Application Serial No. PCT/US2014/064767, International Search Report dated Feb. 26, 2015", 8 pgs.
"International Application Serial No. PCT/US2014/064767, Written Opinion dated Feb. 26, 2015", 8 pgs.
"International Application Serial No. PCT/US2014/065166, International Preliminary Report on Patentability dated Jun. 2, 2016", 8 pgs.
"International Application Serial No. PCT/US2014/065166, International Search Report dated Jan. 22, 2015", 3 pgs.
"International Application Serial No. PCT/US2014/065166, Written Opinion dated Jan. 22, 2015", 6 pgs.
"International Application Serial No. PCT/US2014/066133, International Preliminary Report on Patentability dated Jun. 2, 2016", 9 pgs.
"International Application Serial No. PCT/US2014/066133, International Search Report dated Feb. 24, 2015", 3 pgs.
"International Application Serial No. PCT/US2014/066133, Written Opinion dated Feb. 24, 2015", 7 pgs.
"International Application Serial No. PCT/US2014/071942, International Search Report dated Apr. 17, 2015", 3 pgs.
"International Application Serial No. PCT/US2014/071942, Written Opinion dated Apr. 17, 2015", 7 pgs.
"International Application Serial No. PCT/US2015/024889, International Search Report dated Jun. 29, 2015", 3 pgs.
"International Application Serial No. PCT/US2015/024889, Written Opinion dated Jun. 29, 2015", 11pgs.
"International Application Serial No. PCT/US2015/035114, International Search Report dated Oct. 19, 2015", 3 pgs.
"International Application Serial No. PCT/US2015/035114, Written Opinion dated Oct. 19, 2015", 8 pgs.
"International Application Serial No. PCT/US2015/035313, International Search Report dated Sep. 25, 2015", 4 pgs.
"International Application Serial No. PCT/US2015/035313, Written Opinion dated Sep. 25, 2015", 8 pgs.
"Taiwanese Application Serial No. 104101656, Office Action dated Mar. 21, 2016", 7 pgs.
"Taiwanese Application Serial No. 104101789, Office Action dated Mar. 25, 2016", w/ English Claims, 18 pgs.
"Taiwanese Application Serial No. 104101790, Office Action dated Apr. 21, 2016", w/ English Claims, 12 pgs.
"Taiwanese Application Serial No. 104106272, Office Action dated Apr. 18, 2016", w/ English Claims, 15 pgs.
"Taiwanese Application Serial No. 104106275, Office Action dated Jun. 8, 2016", 3 pgs.
"Taiwanese Application Serial No. 104108803, Office Action dated Jul. 1, 2016", 4 pgs.
"Taiwanese Application Serial No. 104108807, Office Action dated May 26, 2016", W/ English Search Report, 10 pgs.
"Taiwanese Application Serial No. 104110914, Office Action dated Mar. 28, 2016", w/ English Claims, 14 pgs.
"Taiwanese Application Serial No. 104113863, Office Action dated Jun. 6, 2016", 5 pgs.
"Taiwanese Application Serial No. 104117983, Office Action dated Jul. 28, 2016", 5 pgs.
"Taiwanese Application Serial No. 104118504, Office Action dated Jul. 21, 2016", 12 pgs.
"Taiwanese Application Serial No. 105113980, Office Action dated Jul. 21, 2016", 4 pgs.
"VHDL Implementation of Reconfigurable Multimode Block Interleaver for OFDM Based WLAN", IJARECE, vol. 1, [Online]. Retrieved from the Internet: <http://ijarece.org/>, (Oct. 2012), 82-84 pgs.
Choi, Jinsoo, "Discussion on OFDMA in HEW", In: IEEE P802.11—High Efficiency WLAN Study Group, (Nov. 11, 2013), 11 pgs.
Chun, Jinyoung, et al., "Legacy Support on HEW frame structure", IEEE 11-13/1057r0, (Sep. 1, 2013), 8 pgs.
Chun, Jinyoung, et al., "Uplink multi-user transmission", In: IEEE P802.11—High Efficiency WLAN Study Group, (Nov. 11, 2013), 18 pgs.
Hiertz, Guido R, et al., "Proposed direction and priorities for HEW", In: IEEE P802.11—High Efficiency WLAN Study Group, (Nov. 12, 2013), 17 pgs.
Katsuo, Yunoki, et al., "Access Control Enhancement", doc.:IEEE II-13/1073r1, [Online]. Retrieved from the Internet: <https://mentor.ieee.org/802.11/documents?is_dcn=1073>, (Sep. 18, 2013), 1-9.
Koskela, Timo, et al., "Discussion on Potential Techniques for HEW", In: IEEE P802.11 High Efficiency WLAN Study Group, [Online] Retrieved from the Internet : <http://www.ieee802.org/11/Reports/hew_update.html>, (Jul. 15, 2013), 13 pgs.
Oh, Jinhyung, et al., "Distributed implicit interference alignment in 802.11ac WLAN network", International Conference on ICT Convergence (ICTC), (Oct. 2013), 421-426.
"Taiwanese Application Serial No. 104106272, Response filed Oct. 14, 2016 to Office Action dated Apr. 18, 2016", W/ English Clams, 45 pgs.
"Taiwanese Application Serial No. 104108807, Response dated Nov. 25, 2016 Office Action dated May 26, 2016", W/ English Claims, 65 pgs.
"Taiwanese Application Serial No. 104122567, Office Action dated Oct. 13, 2016", W/ English Search Report, 8 pgs.
"Taiwanese Application Serial No. 105113980, Response dated Oct. 24, 2016 to Office Action dated Jul. 21, 2016", W/ English Claims, 80 pgs.
U.S. Appl. No. 15/477,542, filed Apr. 3, 2017, Access Point and Methods for Distinguishing HEW Physical Layer Packets With Backwards Compatibility.
"U.S. Appl. No. 14/341,055, Notice of Allowance dated Jul. 25, 2017", 10 pgs.
"U.S. Appl. No. 15/023,581, Notice of Allowance dated Jul. 27, 2017", 8 pgs.
"U.S. Appl. No. 15/026,022, Examiner Interview Summary dated Sep. 7, 2017", 3 pgs.
"U.S. Appl. No. 15/026,022, Response dated Sep. 7, 2017 to Non Final Office Action dated Jul. 18, 2017", 9 pgs.
"U.S. Appl. No. 15/280,782, Examiner Interview Summary dated Jul. 26, 2017", 3 pgs.
"U.S. Appl. No. 15/280,782, Notice of Allowance dated Sep. 8, 2017", 9 pgs.
"U.S. Appl. No. 15/280,782, Response dated Aug. 11, 2017 to Non Final Office Action dated May 12, 2017", 12 pgs.
"U.S. Appl. No. 15/394,069, Examiner Interview Summary dated Jul. 28, 2017", 3 pgs.
"U.S. Appl. No. 15/394,069, Response dated Aug. 23, 2017 to Non Final Office Action dated May 26, 2017", 12 pgs.
"Chinese Application Serial No. 201580025791.6, Voluntary Amendment dated Jun. 21, 2017", (W/ English Claims), 16 pgs.
"European Application No. 14864664.9, Extended European Search Report dated Aug. 14, 2017", 6 pgs.

(56) References Cited

OTHER PUBLICATIONS

"European Application Serial No. 14864107.9, Extended European Search Report dated Jul. 27, 2017", 13 pgs.
"European Application Serial No. 16168650.6, Communication Pursuant to Article 94(3) EPC dated Aug. 2, 2017", 5 pgs.
Dave, Hedberg, et al., "Adjacent Channel Interference and Filtering for 56-carrier Signals ;11-04-1579-01-000n-11-04-1579-00-000n-aci-results", (Jan. 17, 2005), 1-26 pgs.
Jinyoung, Chun, et al., "Legacy Support on HEW frame structure", IEEE Draft; 11-13-1057-00-0HEW-Legacy-Support-On-HEW-Frame-Structure, IEEE-SA Mentor, Piscataway NJ USA, vol. 802.11 HEW, (Sep. 16, 2013), 1-8.
Sean, Coffey, et al., "WWiSE complete proposal :presentation ; 11-04-0935-04-000n-wwise-complete-proposal presentation", 66 pgs.
U.S. Appl. No. 15/025,634, filed Mar. 29, 2016, HEW Communication Station and Method for Communicating Longer Duration OFDM Symbols Using Minimum Bandwidth Units Having Tone Allocations.
"U.S. Appl. No. 15/023,262, Non Final Office Action dated Jul. 11, 2017", 14 pgs.
"U.S. Appl. No. 15/026,022, Non Final Office Action dated Jul. 18, 2017", 7 pgs.
"European Application Serial No. 14863133.6, Extended European Search Report dated Jul. 3, 2017", 10 pgs.
"European Application Serial No. 14863362.1, Extended European Search Report dated Jul. 18, 2017", 8 pgs.
"European Application Serial No. 14864636.7, Extended European Search Report dated Jul. 21, 2017", 8 pgs.
"European Application Serial No. 14864680.5, Extended European Search Report dated Jul. 18, 2017", 11 pgs.
"Further evaluation on outdoor Wi-Fi ; 11-13-0843-00-0hew-further-evaluation-on-outdoor-wi-fi", Wookbong Lee (LG Electronics): IEEE SA Mentor;11-13-0843-00-0HEW-Further-Evaluation-On-0utd00r-Wi-Fi, IEEE-SA Mentor, Piscataway, NJ USA, (Jul. 15, 2013), 18 pgs.
"HEW SG PHY Considerations for Outdoor Environment; 11-13-0536-00-0hew-hew-sg-phy-considerations-for-outdoor-environment", W00kbong Lee (LG Electronics): IEEE SA Mentor; 11-13-0536-00-0HEW-HEW-SG-PHY-Considerations-for-Outdoor-Environment, IEEE-SAMENTOR, Piscataway, NJ USA (May 13, 2013), 21 pgs.
"Taiwanese Application Serial No. 104122567, Office Action dated Jun. 27, 2017", (W/ Partial English Translation), 5 pgs.
Jianhan, Liu, "Summary and Discussions of Proposals on Potential PHY Technologies in HEW 11-13-1375-01-0hew-summary-and-di scussions-of-proposals-on-potential-phy-technologies-in-hew", IEEE Draft; 11-13-1375-01-0HEW-Summary-and-Discussions-of-Proposals-on-Potential-PHY-Technologies-in-HEW, IEEE-SA Mentor, Piscataway, NJ USA, vol. 802.11 HEW, No. 1,, (Nov. 12, 2013), 1-15.
Jinsoo, Choi, "Discussion on OFDMA in HEW ; 11-13-1382-00-0hew-di scussion-on-ofdma-inhew", (LG Electronics): IEEE Draft; 11-13-1382-00-0HEW-Discussi0n-on-OFDMA-in-HEW, IEEE-SA Mentor, Piscataway, NJ USA vol. 802.11 HEW, (Nov. 12, 2013), 1-11.
Raja, Banerjea, "A simplified STR Mechansim—MAC 11-14-0340-00-0hew-a-simplified-str-mechansim mac", IEEE Draft, 11-14-0340-00-0HEW-A-Simplified-Mechan Sim-MAC, IEEE-Samentor, Piscataway, NJ USA,vol. 802.11HEW, (Mar. 16, 2014), 13 pgs.
Robert, Stacey, "Proposed Specification Framework for TGac; 11-09-0992-21-00ac-proposed-specification-framework for tgac", IEEE SA Mentor, 11-09-0992-21-00AC-Proposed-Specificationframework-for-TGAC,IEEE-SAMENTOR, Piscataway, NJ USA, vol. 802.11ac,No. 21, (Jan. 19, 2011), 49 pgs.
Robert, Stacey, "Proposed TGac Draft Amendment ; 11-10-1361-13-00ac-proposed-tgac-draft-amendment", IEEE SA Mentor;11-1O-1361-O3-00AC-Proposed-TGAC-Draft-Amendment, IEEE-SA Mentor, Piscataway, NJUSA,, (Jan. 19, 2011), 154 pgs.
"European Application Serial No. 14863133.6, Response Filed Jan. 17, 2018 to Extended European Search Report dated Jul. 3, 2017", 12 pgs.
"European Application Serial No. 14863142.7, Response Filed Nov. 15, 2017 to Extended European Search Report dated Mar. 3, 2017", 13 pgs.
"European Application Serial No. 16168650.6, Response Filed Nov. 13, 2017 to Communication Pursuant to Article 94(3) EPC dated Aug. 2, 2017", 10 pgs.
"Taiwanese Application Serial No. 104118345, Response filed Nov. 10, 2017 to Office Action dated May 10, 2017", (W/ English Claims), 68 pgs.
"Taiwanese Application Serial No. 104118345, Response filed Dec. 22, 2017 to Examiner Interview", (W/ English Claims), 52 pgs.
"Taiwanese Application Serial No. 104122567, Response Filed Dec. 22, 2017 to Office Action dated Jun. 27, 2017", (W/ English Claims), 134 pgs.
"Taiwanese Application Serial No. 105139522, Office Action dated Jan. 5, 2018", w/English Translation, 4 pgs.
"U.S. Appl. No. 15/023,262, Notice of Allowance dated Dec. 21, 2017", 8 pgs.
"U.S. Appl. No. 15/025,634, Non Final Office Action dated Oct. 27, 2017", 21 pgs.
"U.S. Appl. No. 15/026,022, Corrected Notice of Allowance dated Dec. 13, 2017", 2 pgs.
"U.S. Appl. No. 15/280,782, Corrected Notice of Allowance dated Nov. 3, 2017", 2 pgs.
"U.S. Appl. No. 15/394,069, Corrected Notice of Allowance dated Nov. 9, 2017", 2 pgs.
"U.S. Appl. No. 15/801,680, Preliminary Amendment filed Dec. 21, 2017", 10 pgs.
"IEEE Standard for information technology—Telecommunications and information exchange between systems—Local and metropolitan area networks—Specific Requirements Part 11: Wireless LAN Medium Access Control (MAC) and Physical Layer (PHY) Specifications", IEEE Computer Society, (2009), 266 pgs.
"IEEE Standard for information technology—Telecommunications and information exchange between systems—Local and metropolitan area networks—Specific Requirements Part 11: Wireless LAN Medium Access Control (MAC) and Physical Layer (PHY) Specifications", IEEE Computer Society, (2013), 244 pgs.
"Part 11: Wireless LAN Medium Access Control (MAC) and Physical Layer (PHY) Specifications Part 1 of 2", IEEE Computer Society IEEE Std 802.11-2016 (Revision of IEEE Std 802.11-2012), (2016), 2000.
"Part 11: Wireless LAN Medium Access Control (MAC) and Physical Layer (PHY) Specifications Part 2 of 2", IEEE Computer Society IEEE Std 802.11-2016 (Revision of IEEE Std 802.11-2012), (2016), 1535.

* cited by examiner

| FIELD | N TONE FIELD AS A FUNCTION OF BANDWIDTH PER FREQUENCY SEGMENT | | | | GUARD INTERVAL DURATION |
|---|---|---|---|---|---|
| | 20 MHz | 40 MHz | 80 MHz | 160 MHz | |
| 202 — L-STF | 12 | 24 | 48 | 96 | — |
| 204 — L-LTF | 52 | 104 | 208 | 416 | $T_{GI2}$ |
| 206 — L-SIG | 52 | 104 | 208 | 416 | $T_{GI}$ |
| 208 — VHT-SIG-A | 52 | 104 | 208 | 416 | $T_{GI}$ |
| 209 — VHT-STF | 12 | 24 | 48 | 96 | — |
| 210 — VHT-LTF | 56 | 114 | 242 | 484 | $T_{GI}$ |
| 212 — VHT-SIG-B | 56 | 114 | 242 | 484 | $T_{GI}$ |
| 216 — VHT-DATA | 56 | 114 | 242 | 484 | $T_{GI}$ OR $T_{GI2}$ |
| NON HT DUP OFDM DATA | — | 104 | 208 | 416 | $T_{GI}$ |

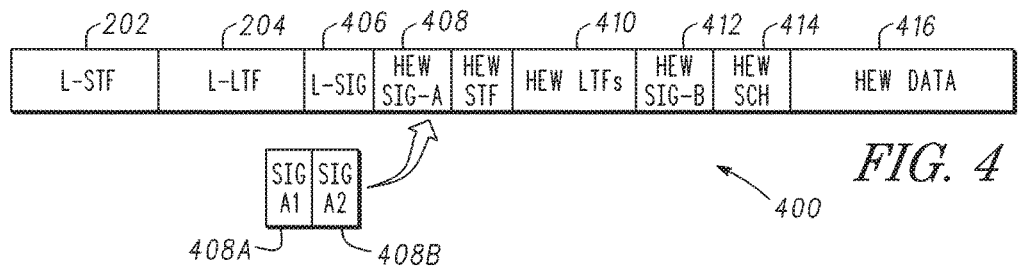
FIG. 4
| FIELD | N TONE FIELD AS A FUNCTION OF BANDWIDTH PER FREQUENCY SEGMENT | | | | GUARD INTERVAL DURATION |
|---|---|---|---|---|---|
| | 20 MHz | 40 MHz | 80 MHz | 160 MHz | |
| 202—L-STF | 12 | 24 | 48 | 96 | - |
| 204—L-LTF | 52 | 104 | 208 | 416 | $T_{GI2}$ |
| 406—L-SIG | 56 | 114 | 242 | 484 | $T_{GI}$ |
| 408—HEW-SIG-A | 56 | 114 | 242 | 484 | $T_{GI}$ |
| HEW-STF | 12 | 24 | 48 | 96 | - |
| 410—HEW-LTFs | 56 | 114 | 242 | 484 | $T_{GI}$ |
| 412—HEW-SIG-B | 56 | 114 | 242 | 484 | $T_{GI}$ |
| 414—HEW-SCH | 56 | 114 | 242 | 484 | |
| 416—HEW-DATA | 56 | 114 | 242 | 484 | $T_{GI}$ OR $T_{GI2}$ |
FIG. 5
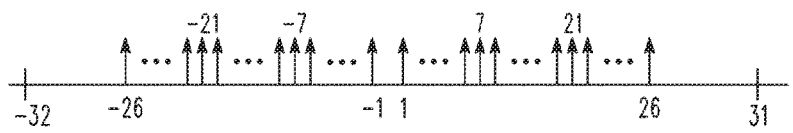
FIG. 6A
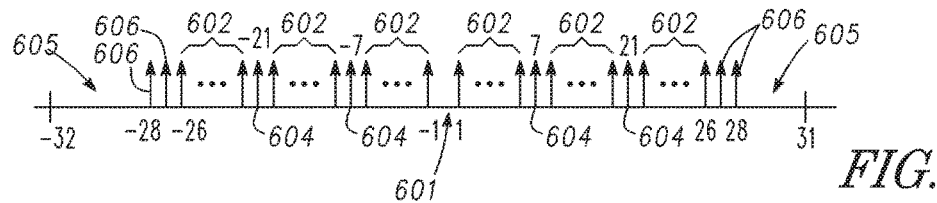
FIG. 6B

WIRELESS APPARATUS FOR HIGH-EFFICIENCY (HE) COMMUNICATION WITH ADDITIONAL SUBCARRIERS

PRIORITY CLAIMS

This application is a continuation of U.S. patent application Ser. No. 15/052,600, filed Feb. 24, 2016, which is a continuation of U.S. patent application Ser. No. 14/338,137, filed Jul. 22, 2014, now issued as U.S. Pat. No. 9,325,463, which claims priority under 35 U.S.C. 119 to: U.S. Provisional Patent Applications:
Ser. No. 61/906,059 filed Nov. 19, 2013,
Ser. No. 61/973,376 filed Apr. 1, 2014,
Ser. No. 61/976,951 filed Apr. 8, 2014,
Ser. No. 61/986,256 filed Apr. 30, 2014,
Ser. No. 61/986,250 filed Apr. 30, 2014,
Ser. No. 61/991,730 filed May 12, 2014,
Ser. No. 62/013,869 filed Jun. 18, 2014,
Ser. No. 62/024,801 filed Jul. 15, 2014, and which are all incorporated herein by reference in their entirety.

TECHNICAL FIELD

Embodiments pertain to wireless networks. Some embodiments relate to Wi-Fi networks and wireless local area networks (WLANs) operating in accordance with one of the IEEE 802.11 standards, such as the IEEE 802.11ac standard or the IEEE 802.11ax SIG (named DensiFi). Some embodiments relate to high-efficiency WLAN (HEW) communications.

BACKGROUND

Wi-Fi communications has been evolving toward ever increasing data rates (e.g., from IEEE 802.11a/g to IEEE 802.11n to IEEE 802.11ac). The upcoming IEEE 802.11ax standard for High Efficiency WLAN (HEW) is the next evolution of these standards. Thus there are general needs in HEW for achieving an increase in data capacity without additional overhead while maintaining compatibility with legacy systems. There are general needs in HEW for achieving an increase in data capacity while minimizing overhead.

BRIEF DESCRIPTION OF THE DRAWINGS

FIG. 4 illustrates an HEW frame in accordance with some embodiments;
FIG. 5 is a table illustrating the number of subcarriers for various fields of an HEW frame in accordance with some embodiments;
FIG. 6A illustrates subcarrier allocations for legacy systems;
FIG. 6B illustrates subcarrier allocations for HEW in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
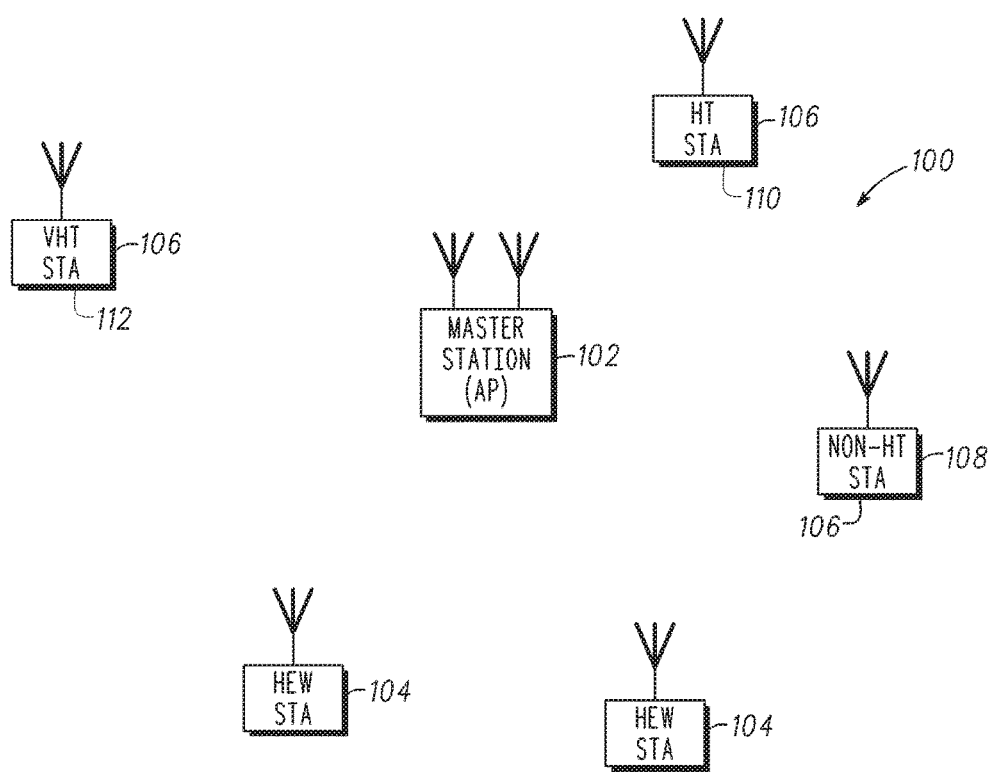
FIG. 1 illustrates an HEW network in accordance with some embodiments.

FIG. 1 illustrates an HEW network in accordance with some embodiments. HEW network 100 may include a master station (STA) 102, a plurality of HEW stations 104 (i.e., HEW devices) and a plurality of legacy stations 106 (legacy devices). The master station 102 may be arranged to communicate with the HEW stations 104 and the legacy stations 106 in accordance with one or more of the IEEE 802.11 standards. In some embodiments, the master station 102 may be arranged to communicate with the HEW stations 104 in accordance with an IEEE 802.11ax standard for HEW. In some embodiments, the master station 102 may be an access point (AP), although the scope of the embodiments is not limited in this respect. Although HEW refers to high-efficiency WLAN, it may also refer to high-efficiency Wi-Fi.

In accordance with embodiments, the master station 102 may include physical layer (PHY) and medium-access control layer (MAC) circuitry which may be arranged to contend for a wireless medium (e.g., during a contention period) to receive exclusive control of the medium for an HEW control period (i.e., a transmission opportunity (TXOP)). The master station 102 may transmit an HEW master-sync transmission at the beginning of the HEW control period. During the HEW control period, the HEW stations 104 may communicate with the master station 102 in accordance with a non-contention based scheduled multiple-access technique. This is unlike conventional Wi-Fi communications in which devices communicate in accordance with a contention-based communication technique, rather than a non-contention multiple-access technique. During the HEW control period, legacy stations 106 refrain from communicating. In some embodiments, the master-sync transmission may be referred to as an HEW control and schedule transmission.

In accordance with embodiments, the master-sync transmission may include a multi-device HEW preamble arranged to signal and identify data fields for a plurality of scheduled HEW stations 104. The master station 102 may further be arranged to transmit (in the downlink direction) and/or receive (in the uplink direction) one or more of the data fields to/from the scheduled HEW stations 104 during the HEW control period. In these embodiments, the master station 102 may include training fields in the multi-device HEW preamble to allow each of the scheduled HEW stations 104 to perform synchronization and an initial channel estimation.

In accordance with some embodiments, an HEW station 104 may be a Wi-Fi or IEEE 802.11 configured station (STA) that is further configured for HEW operation (e.g., in accordance with IEEE 802.11 ax). An HEW station 104 may be configured to communicate with a master station 102 in accordance with a non-contention-based multiple access technique, such as a scheduled orthogonal frequency division multiple access (OFDMA) technique, during the HEW control period and may be configured to receive and decode the multi-device HEW preamble of an HEW frame. An HEW station 104 may also be configured to decode an indicated data field received by the master station 102 during the HEW control period.

In accordance with embodiments, the master station 102 may configure an HEW frame to include a legacy signal field (L-SIG), an HEW signal field (HEW SIG-A) following the L-SIG, and one or more HEW fields following the HEW SIG-A 408. The L-SIG may be configured for transmission using a legacy number of data subcarriers, a legacy number of pilot subcarriers, and a number of additional reference subcarriers modulated with a known reference sequence. At least one symbol of the HEW SIG-A and the one or more HEW fields following the HEW SIG-A of the HEW frame may be configured for transmission using additional data subcarriers. The additional data subcarriers may correspond to the additional reference subcarriers of the L-SIG. In these embodiments, increased data. capacity is achieved by increasing the number of signaling bits without an increase in packet overhead. These embodiments are discussed in more detail below.

Figures 2, 3:
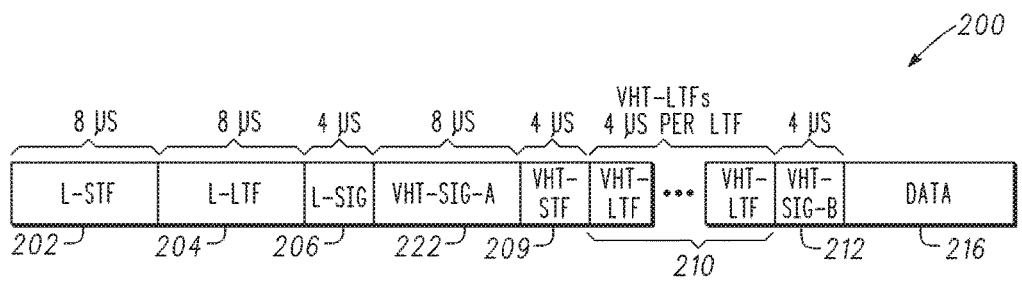
FIG. 2 illustrates a legacy frame.
FIG. 3 is a table illustrating the number of subcarriers for various fields of a legacy frame.

FIG. 2 illustrates a legacy frame. Legacy frame 200 may include legacy short training field (L-STF) 202, legacy long training field (L-LTF) 204, legacy signal field (L-SIG) 206, VHT signal field (VHT-SIG-A) 208, a VHT-STF 209, VHT-LTFs 210, a VHT-SIG-B 212 and data 216. For a 20 MHz channel, the L-SIG 206, as well as some of the fields following the L-SIG 206 (e.g., the VHT-SIG-A 208), may use a legacy number of data subcarriers (i.e., 48) and a legacy number of pilot subcarriers (i.e., 4).

FIG. 3 is a table illustrating the number of subcarriers for various fields of a legacy frame. As shown in FIG. 3, for a 20 MHz channel, the L-SIG 206, as well as some of the fields following the L-SIG 206 (e.g., the VHT-SIG-A 208), may use a legacy number of data subcarriers (i.e., 48) and a legacy number of pilot subcarriers (i.e., 4) for a total of 52 subcarriers. For a 40 MHz channel, the L-SIG 206 and the VHT-SIG-A 208 may utilize a total of 104 subcarriers, for an 80 MHz channel, the L-SIG 206 and the VHT-SIG-A 208 may utilize a total of 208 subcarriers and for a 160 MHz channel, the L-SIG 206 and the VHT-SIG-A 208 may utilize a total of 416 subcarriers.

FIG. 4 illustrates an HEW frame in accordance with some embodiments. HEW frame 400 may include legacy short training field (L-STF) 202, legacy long training field (L-LTE) 204, legacy signal field (L-SIG) 406, HEW signal field (HEW SIG-A) 408, a HEW-STF 409, HEW-LTFs 210, an HEW-SIG-B 212, an HEW schedule field (HEW-SCH) 414 and data 216. In accordance with embodiments, the access point, when configured to operate as a master station 102 for HEW communications may configure the HEW frame 400 to include the L-SIG 406, the HEW SIG-A 408 following the L-SIG 406 and one or more HEW fields following the HEW SIG-A 408. The L-SIG 406 may be configured for transmission using a legacy number of data subcarriers, a legacy number of pilot subcarriers, and a number of additional reference subcarriers modulated with a known reference sequence. At least one symbol of the HEW SIG-A 408 and the one or more HEW fields following the HEW SIG-A 408 of the HEW frame 400 may be configured for transmission using additional data subcarriers. The additional data subcarriers may correspond to the additional reference subcarriers of the L-SIG 406. Increased data capacity is achieved by increasing the number of signaling bits in the HEW SIG-A 408 without an increase in packet overhead.

FIG. 5 is a table illustrating the number of subcarriers for various fields of an HEW frame in accordance with some embodiments. As shown in FIG. 5, for a 20 MHz channel, the L-SIG 406 may use a legacy number of data subcarriers (i.e., 48), a number of additional reference subcarriers (e.g., four) modulated with a known reference sequence, and a legacy number of pilot subcarriers (i.e., 4) for a total of 56 subcarriers. For a 20 MHz channel, the HEW SIG-A 408 may use a legacy number of data subcarriers (i.e., 48), a number of additional reference subcarriers (e.g., four) modulated with a known reference sequence, and a legacy number of pilot subcarriers (i.e., 4) for a total of 56 subcarriers. For a 40 MHz channel, the L-SIG 406 and the HEW SIG-A 408 may utilize a total of 114 subcarriers, for an 80 MHz channel, the L-SIG 406 and the HEW SIG-A 408 may utilize a total of 242 subcarriers, and for a 160 MHz channel, the L-SIG 406 and the HEW SIG-A 408 may utilize a total of 484 subcarriers, for example.

FIG. 6A illustrates subcarrier allocations for legacy systems. The subcarrier allocations illustrated in FIG. 6A may be used for the L-SIG 206 (FIG. 2) and the VHT-SIG-A 208 (FIG. 2) and illustrate a total of 52 subcarriers (located between positions −26 and +26).

FIG. 6B illustrates subcarrier allocations for HEW in accordance with some embodiments. The subcarrier allocations illustrated in FIG. 6B may be used for the L-SIG 406 (FIG. 4) and one or more field following the 406 include the HEW SIG-A 408 (FIG. 4) and illustrate a total of 56 subcarriers (e.g., located between positions −28 and +28). The subcarrier allocations illustrated in FIG. 6B may include a legacy number of data subcarriers 602, a legacy number of pilot subcarriers 604, and a number of additional reference subcarriers 606.

In accordance with some embodiments, the L-SIG 406 may configured for transmission using the legacy number of data subcarriers 602, the legacy number of pilot subcarriers 604, and a number of additional reference subcarriers 606 modulated with a known reference sequence. At least one symbol of the HEW SIG-A 408 and the one or more HEW fields following the HEW SIG-A 408 of the HEW frame 400 may also be configured for transmission using additional data subcarriers 606. The additional data subcarriers corresponding to the additional reference subcarriers 606 of the L-SIG 406.

In accordance with some embodiments, for a 20 MHz channel, the legacy number of data subcarriers 602 may be forty-eight, the legacy number of pilot subcarriers 604 may be four, and the number of additional subcarriers 606 modulated with a known reference sequence may be four, for a total of sixty-four subcarriers including additional null subcarriers (e.g., the DC subcarrier 601 and guard band subcarriers). The number of data subcarriers of the HEW data field 416 following the HEW SIG-A 408 may be fifty-two. In these embodiments, for a 20 MHz channel, the signal including the L-SIG 408 and following the L-SIG 408 is transmitted on a total of fifty-six subcarriers of the L-SIG 408. The number of data subcarriers of the HEW data field 416 may be fifty-two (e.g., the forty-eight legacy data subcarriers and the four additional data subcarriers). As illustrated in FIG. 6, the L-SIG 406 may also include a DC subcarrier 601 and guard tones 605. In these embodiments, the L-SIG 406 may comprise an OFDM symbol that may be generated using a 64-point FFT. In some embodiments, an HEW frame 400 may be transmitted over wider bandwidths that may comprise a plurality of 20 MHz channels. In some embodiments, bandwidth may be one of 20 MHz, 40 MHz, 80 MHz or 160 MHz, In some embodiments, a 320 MHz bandwidth may be used.

In accordance with some embodiments, when the HEW frame 400 includes a legacy long-training field (L-LTF) 404 preceding the L-SIG 406, the access point may be configured to scale (e.g., increase) a per-subcarrier power allocation the L-SIG 406 by a factor of 56/52. In some alternate embodiments, the hardware processing circuitry may be configured to scale (e.g., decrease) the per-subcarrier power allocation of the L-LTF 404 by a factor of 52/56. In these embodiments, scaling the per-subcarrier power allocation the either the L-LTF 204 or the L-SIG 406 may help maintain the same overall power level of these fields to reduce any effect on the decoding performance of legacy devices.

In some embodiments, for a 20 MHz channel, the pilot subcarriers 604 are located at positions −21, −7, 7, 21 with respect to a DC subcarrier 601 and the additional reference subcarriers 606 are located at positions −28, −27, 27, 28 with respect to the DC subcarrier 601. In these embodiments, the additional data subcarriers 606 used by the HEW SIG-A 408 and the one or more HEW fields following the HEW SIG-A 408 may also be located at positions −28, −27, 27, 28 with respect to the DC subcarrier 601.

In some embodiments, the known reference sequence that is modulated on the additional reference subcarriers 606 of the L-SIG 406 may be used for channel estimation by a receiving HEW station 104 (FIG. 1) to allow the receiving HEW station 104 to demodulate and decode the additional data subcarriers of the HEW SIG-A 408 and the additional data subcarriers of the one or more HEW fields following the HEW SIG-A 408. In these embodiments, the HEW frame 400 may also be configured to include a legacy short training field (L-STF) 202 and a legacy long-training field (L-LTF) 204 preceding the L-SIG 406. The L-STF 202 and the L-LTF 204 may be conventional legacy training fields. In accordance with embodiments, channel estimates for the subcarriers in FIG. 6A may be determined from the L-LIT 204 (i.e., all subcarriers of FIG. 6B except for additional reference subcarriers 606), while channel estimates for the additional subcarriers 606 may be determined from the additional reference subcarriers 606 of the L-SIG 406.

In some embodiments, the access point may be configured to scale (i.e., increase) a per-subcarrier power allocation the L-SIG 406 by a factor of B/A, where A is the legacy number of data subcarriers 602 plus the legacy number of pilot subcarriers 604, and B is the legacy number of data subcarriers 602 plus the legacy number of pilot subcarriers 604 plus the number of additional subcarriers 606.

In some embodiments, the pilot subcarriers 604 and the additional reference subcarriers 606 of the L-SIG 408 carry information that is known a-priori to the receiver (e.g., a known reference sequence. In some embodiments, the pilot subcarriers 604 and the additional reference subcarriers 606 of the L-SIG 408 may have the same modulation (e.g., BPSK+1 or BPSK−1), while in other embodiments, the pilot subcarriers 604 and the additional reference subcarriers 606 of the L-SIG 408 may have a different modulation (e.g., pilot subcarriers 604 may have BPSK+1 while the additional reference subcarriers 606 may have BPSK−1).

In some embodiments, one or more HEW fields following the HEW SIG-A 408 of the HEW frame 400 may include an HEW data field 416 and an HEW schedule field (HEW-SCH) 414 preceding the data field 416. The HEW-SCH 414 may include scheduling information for one or more HEW stations 104 that are scheduled to communication with the access point 102 during the data field 416 in accordance with a scheduled orthogonal-frequency divisional multiple-access (OFDMA) technique, In these embodiments, the HEW-SCH 414 and the data field 416 may utilize additional data subcarriers 606 providing for an increase in data capacity. For example, the data subcarriers may be increased from 48 to 52. In some embodiments, the scheduled OFDMA technique may include uplink or downlink communications and may also include the use of uplink or downlink spatial-division multiple access (SDMA), although the scope of the embodiments is not limited in this respect.

In some embodiments, the HEW SIG-A 408 comprises at least a first symbol (HEW SIG-A1) 408A and a second symbol (HEW SIG-A2) 408B. In these embodiments, information bits carried by HEW SIG-A1 408A may be mapped on the legacy data subcarriers 602, pilot subcarriers of the HEW SIG-A1 408A may be mapped on the legacy pilot subcarriers 604. The additional reference subcarriers 606 of the HEW SIG-A1 408A may be modulated with a known reference sequence, Information bits carried by HEW SIG-A2 408B may be mapped on the data subcarriers 602 and the additional reference subcarriers 606. The pilot subcarriers of the HEW SIG-A2 408B may be mapped on the legacy pilot subcarriers 604. In these embodiments, the HEW SIG-A2 408B may have an extra four subcarriers for data allocation (e.g., up to 52 data subcarriers for a 20 MHz channel). In these embodiments, rather than a conventional joint encoder/decoder, separate encoders/decoders may be used for the HEW SIG-A1 408A and the HEW SIG-A2 408B. In these embodiments, the extra reference subcarriers of the HEW SIG-A1 408A may be utilized the same way the extra four reference subcarriers 606 are utilized in L-SIG 406 (e.g., for channel estimation) to provide a more robust channel estimation in low SNR cases because receiver may be configured to perform averaging over the reference subcarriers of L-SIG 406 and HEW SIG-A1 408.

In some embodiments, the HEW SIG-A 408 may include additional symbols, such as an HEW SIG-A3, and HEW SIG-A4, etc. In these embodiments, the additional symbols of the HEW SIG-A 408 may be configured similarly to the HEW SIG-A2 408 B utilizing the extra subcarriers for data allocation. In these embodiments, the additional symbols of the HEW SIG-A 408 as well as the number of additional symbols that may be used may depend on the amount of information to be carried.

In some embodiments, when the access point 102 is operating as a master station, the access point may be configured to contend for a wireless medium during a contention period to receive control of the medium for the HEW control period, and transmit the HEW frame during the HEW control period, wherein during the HEW control period, the master station has exclusive use of the wireless medium for communication with the scheduled HEW stations 104 in accordance with a non-contention based multiple-access technique. In some embodiments, the non-contention based multiple-access technique may be a scheduled OFDMA technique and may include uplink or downlink communications and may also include the use of uplink or downlink SDMA, although the scope of the embodiments is not limited in this respect. In these embodiments, the access point 102 may either transmit, within the HEW control period, downlink data multiplexed to each of a plurality of scheduled HEW stations, or receive, within the HEW control period, or uplink data multiplexed from the plurality of scheduled HEW stations. The downlink data from each scheduled station 104 may correspond to one link and comprising one or more streams. The uplink data from each scheduled station may correspond to one link and comprising one or more streams. The downlink data and the uplink data may be time-multiplexed, frequency multiplexed and/or spatially multiplexed. In these embodiments, the access point 102 may include the number of LTFs in an LTF portion 410 of an HEW preamble and may include an HEW schedule field (HEW-SCH) 414 to follow the LTF portion. In these embodiments, the access point 102 may configure the HEW frame to include a legacy preamble to precede the HEW preamble. In these embodiments, the HEW-SCH 414 may be configured to identify one or more of modulation parameters for each of the links, an encoding type for each of the links, whether each link is a single user (SU) link or a multi-user (MU) link; and a number of streams for each link. Each data field 416 may be associated with either a single user (SU) link or a multi-user (MU) link, each link configurable to provide multiple streams of data. In some embodiments, the master station may provide an indication of the number of LTFs that are included in the LTF portion of the HEW preamble. In some embodiments, the selection of the number of LTFs to be included in the HEW preamble may be based on a maximum number of streams to be transmitted on a single link, although the scope of the embodiments is not limited in this respect.

In accordance with embodiments, a communication station 104 that is configured for HEW communication may be configured to receive an HEW frame 400 that includes at least the L-SIG 406, the HEW SIG-A 408 following the L-SIG 406, and one or more HEW fields following the HEW SIG-A 408. In these embodiments, the HEW station 104 may be configured to decode the data subcarriers 602 of the L-SIG 406 to determine length and rate information, calculate channel estimates for the additional reference subcarriers 606 of the L-SIG 406 from the known reference sequence, and utilize the channel estimates to decode the additional data subcarriers of the at least one symbol of HEW SIG-A 408 and the one or more HEW fields following the HEW SIG-A 408.

In some embodiments, the HEW station 104 may be further configured to refrain from decoding the additional reference subcarriers 606 of the L-SIG 406. These additional reference subcarriers 606 of the L-SIG 406 are for use in determining channel estimates and do not carry any data.

In some embodiments, the HEW station 104 may be configured to utilize channel estimates determined from a legacy training field (e.g., L-LTF 204) and additional reference subcarriers L-SIG 406 to decode data subcarriers of the HEW SIG-A 408. The data subcarriers of the HEW SIG-A 408 correspond to the data subcarriers of the L-SIG 406 and the additional data subcarriers correspond to the additional reference subcarriers 606 of the 406. In these embodiments, all (e.g., 52) data subcarriers of the HEW-SIG A 408 (the additional data subcarriers (corresponding to the additional reference subcarriers 606 of the L-SIG 406) and the legacy data subcarriers (corresponding to data subcarriers 602 of the L-SIG 406)) may be demodulated and decoded together. A 64-point FFT, for example, may be used. Conventionally, the legacy signal field did not utilize additional reference subcarriers 606.

In some embodiments, the HEW station 104 may further be configured to determine whether a received frame is an HEW frame 400 or a legacy frame based on whether a value in the length field of the L-SIG is divisible three or based on a phase rotation applied to BPSK modulation of first and second symbols of a subsequent signal field.

In some embodiments, the HEW station 104 may utilize the additional reference subcarriers 606 of the HEW SIG-A1 408A and the additional reference subcarriers 606 of the L-SIG 406 for channel estimation (e.g., using a combining or averaging technique). In these embodiments, the HEW station 104 may decode the HEW SIG-A2 408B based on channel estimates obtained from a L-LTF 204, the L-SIG 406 and the HEW SIG-A1 408A, although the scope of the embodiments is not limited in this respect.

In accordance with some embodiments, the master station 102 may be arranged to select a number of long-training fields (LTFs) to be included in the multi-device HEW preamble of an HEW frame. The HEW frame may comprise a plurality of links for transmission of a plurality of data streams. The master station 102 may also transmit the selected number of LTFs sequentially as part of the multi-device HEW preamble and transmit a plurality of data fields sequentially to each of a plurality of scheduled HEW stations 104. The data fields may be part of the HEW frame. Each data field may correspond to one of the links and may comprise one or more data streams. In some embodiments, the data fields may be referred to as packets. The master station 102 may also be arranged receive packets from HEW stations 104 in the uplink direction during the HEW control period.

In some embodiments, the master station 102 may be arranged to configure a multi-device HEW preamble to include an HEW control signal field (HEW-SCH) to identify and signal each of the data fields of the HEW frame. In these embodiments, a single HEW preamble is included in an HEW frame, which is unlike conventional techniques which include a preamble for each link.

In these embodiments, the HEW master-sync transmission that may be transmitted at the beginning of the HEW control period may include the multi-device HEW preamble. The data fields of the HEW frame may be transmitted by the master station 102 after the multi-device HEW preamble within the HEW control period in the downlink direction and/or received by the master station 102 in the uplink direction.

In some embodiments, the links (e.g., data fields) of an HEW frame may be configurable to have the same bandwidth and the bandwidth may be one of 20 MHz, 40 MHz, or 80 MHz contiguous bandwidths or an 80+80 MHz (160 MHz) non-contiguous bandwidth. In some embodiments, a 320 MHz contiguous bandwidth may be used. In some embodiments, bandwidths of 1 MHz, 1.25 MHZ, 2.5 MHz, 5 MHz and/or 10 MHz may also be used. In these embodiments, each link of an HEW frame may be configured for transmitting a number of spatial streams.

Embodiments disclosed herein increase the number of information bits which can be carried in OFDM symbols transmitted after the legacy (IEEE 802.11a/g) part of Wi-Fi preamble (L-SIG). Since HEW is an evolution of the previous standards and needs to coexist with the legacy systems, HEW specific transmissions may begin with the legacy preamble. The legacy portion of the preamble may include the L-STF 202, L-LTF 204, and L-SIG 206 (see FIG. 2) to allow legacy devices to detect HEW transmissions and to defer appropriately. After decoding the L-SIG 206, if HEW devices can identify each transmission as either a HEW packet or a legacy packet, the rest of packet can be transmitted with a HEW specific format. Any signal field after the L-SIG may be however limited to channel estimates obtained from L-LTF until a new HEW-LTF is transmitted. This limitation has been the case in previous versions of the standards, namely IEEE 802.11n/ac as well. As depicted in FIG. 2, in IEEE 802.11ac the VHT-SIG-A follows L-SIG, and as identified in the table of FIG. 3, the number of subcarriers matches the L-SIG. The OFDMA symbols transmitted after the VHT-LTF have a larger number of data subcarriers because only after processing the VHT-LTFs does the receiver have channel estimates for larger number of subcarriers.

As a result of this limitation, the number of information bits carried in VHT-SIG-A 208 is limited to the number of information bits carried in L-SIG because they have same number of data-subcarriers and use the same modulation order and code rate. Embodiments disclosed herein provide for an increase in the number of subcarriers, e.g., in the HEW SIG-A 408 (e.g., to 56, 112, 224 and 448 subcarriers for 20 MHz, 40 MHz, 80 MHz and 160 MHz, respectively). This increase in the number of subcarriers may directly translate to the increased number of information bits. Given that OFDMA is a promising technology for HEW and the fact that OFDMA may require additional information to be signaled and therefore more bits of to be carried in HEW SIG-A 408, these embodiments enable a more efficient OFDMA bit allocation. It should be noted that carrying more information bits in the HEW SIG-A 408 is very valuable because otherwise an additional complete symbol may be required in the preamble increasing the overall protocol overhead. Since the focus on HEW is efficiency, having a mechanism which increases information bits without adding any additional overhead is key for a successful design, and increases the chance of direct adoption in the standard.

In accordance with embodiments, additional reference subcarriers are introduced into the L-SIG 406 without impacting the performance of legacy devices 106 in detecting the L-SIG 406. Legacy devices 106 are not aware of the existence of the additional reference subcarriers and are able to decode the L-SIG 406 as before. However, HEW devices 104 may be configured to be aware of the additional reference subcarriers and use them for obtaining channel estimates for their corresponding subcarriers while decoding the L-SIG similar to legacy devices. These newly obtained channel estimates, attained through the use of the reference subcarriers, are used in a HEW receiver for decoding the subsequence OFDM symbols and in particular for decoding the HEW SIG-A 408 with an increased number of subcarriers.

One target for HEW is to adopt methods to improve the efficiency of and specifically the efficiency in dense deployments. With each new amendment to the standard, additional signaling is utilized so the subsequent amended systems can identify each transmission and categorize it as either one of the legacy systems transmissions or one from the newer amended standard. In Wi-Fi, to maintain legacy capability, the preamble portion of the packet has been increased and new fields added with various modulation formats so that the new releases could be identified. In accordance with embodiments, HEW devices 104 are able to identify a HEW packet from legacy packets. In these embodiments, an HEW frame 400 may be configured to have the format as shown in FIG. 4. It should be noted that the exact number of fields, their order and duration in time do not change the main concept and these embodiments which can be applied to a more general format, and other bandwidths.

In accordance with embodiments, the OFDM structure of the L-SIG utilizes a 64-FFT with subcarrier allocation as shown in FIG. 6A where the pilots are located at positions (−21, −7, 7, 21). Pilot tones are assigned after encoder and interleaver. Some embodiments may extend L-SIG to 56 subcarriers similar to the subcarrier allocation as shown in FIG. 6B. The newly assigned reference subcarriers illustrated in FIG. 6B (−28, −27, 27, 28) may be known to the HEW receiver and may be used for channel estimation which will be utilized in the subsequence OFDM symbols HEW SIG-A as depicted in FIG. 4. Similar to pilot tones, these reference subcarriers do not go through encoder and interleaver. The reference sub-carriers are assigned some polarity. Those skilled in art may run computer search programs to find their exact values. In general, the values are selected to provide the best peak-to-average power ratio (PAPR) for a combination of random and deterministic selection of information bits in L-SIG. A simple example of it can make the L-SIG extension similar to the extension of the L-LTF to HT-LTF in Greenfield 11n format. The L-SIG with the additional reference subcarriers may also utilize a 64-bit FFT.

The addition of these new reference symbols to the L-SIG may have no negative impact to the detection of the L-SIG by legacy devices 106 or HEW devices 104. Also because it may only be one OFDM symbol out of many in a packet, it will not impact adjacent channel interference. However, attention should be given to the per-tone power scaling. With this extension, per-tone power scaling on L-LTF may be different than on L-SIG, which could affect decoding performance for legacy devices. To make the per-tone power level the same, in some embodiments, the L-LTF symbol power may be lowered (e.g., by 52/56, for example) depending on the number of subcarriers.

In accordance with embodiments, an HEW receiver proceeds to decode the L-SIG 406 the same as legacy operation by de-interleaving and decoding 52 legacy subcarriers. Additionally, an HEW station 104 may then calculate channel estimations for subcarriers (e.g., subcarriers at positions −28, −27, 27, 28) using the new reference sub-carriers. If the received packet is identified as an HEW frame, the HEW receiver will utilize channel estimations of the subcarriers at positions −28, −27, 27, 28 in addition to those obtained from the L-LTF in decoding the subsequent OFDM symbols. Having these extended channel estimations available allows the HEW SIG-A to now carry 56 data subcarrier allocations as shown in FIG. 6B. Assuming BPSK modulation and rate 1/2 coding (or QBPSK) for HEW SIG-A 408, this translates to an additional two information bits. Subcarriers at positions −28, −27, 27, and 28 are used as an example only as the scope of the embodiments is not limited in this respect.

In some other embodiments, currently the L-LTF is a repetition of two long training sequences (LTS), and as such, in a very low SNR scenario, the receiver may perform averaging over the two LTSs to obtain more reliable channel estimation. To allow for this same averaging in this proposal for HEW, then the explained subcarrier extension can also be applied to the OFDM symbol that immediately follows L-SIG. In a format such as the one shown in FIG. 4, that would be the first OFDM symbol of the HEW SIG-A1 408A. Therefore, in this example, the HEW SIG-A1 408A may have 52 subcarriers similar to VHT-SIG-A1. Both the L-SIG and SIG-A1 may be used to calculate channel estimates using the new reference sub-carriers (−28, −27, 27, 28). Then HEW SIG-A2 408B may have an extra four subcarriers for data allocation. In this case, HEW SIG-A1 and HEW SIG-A2 may have independent encoder/decoders unlike the VHT-SIG-A1 and VHT-SIG-A2 that have a joint encoder/decoder.

Embodiments disclosed herein provide a method that increases the number of subcarriers in the 20 MHz L-SIG (e.g., to 56). Because the L-SIG is duplicated to support bandwidth of 40 MHz in 802.11n, and similar duplication is done to support 80 MHz and 160 MHz in IEEE 802.11ac, the extension L-SIG to 112, 224 and 448 for 40, 80 and 160 MHz, respectively, can be readily applied. The extended reference subcarriers may be utilized at HEW receivers to obtain channel estimates in addition to those obtained from L-LTF. Having channel estimates for 56 subcarriers allows utilizing 56 subcarriers in subsequent OFDM symbols as contrasted to 52 in IEEE 802.11n/11ac. Therefore four data subcarriers are added to HEW SIG-A with no extra overhead. Since the focus on HEW is efficiency, having a mechanism which increases the number of signaling bits without adding any additional overhead is a key to a successful design and increases the chance of direct adoption in the Standards.

Figure 7:
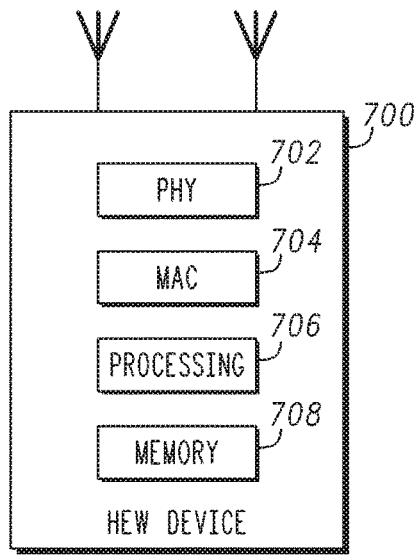
FIG. 7 illustrates an HEW communication device in accordance with some embodiments.

FIG. 7 illustrates an HEW device in accordance with some embodiments. HEW device 700 may be an HEW compliant device that may be arranged to communicate with one or more other HEW devices, such as HEW stations 104 (FIG. 1) or master station 102 (FIG. 1), as well as communicate with legacy devices. HEW device 700 may be suitable for operating as master station 102 (FIG. 1) or an HEW station 104 (FIG. 1). In accordance with embodiments, HEW device 700 may include, among other things, hardware processing circuitry that may include physical layer (PHY) circuitry 702 and medium-access control layer circuitry (MAC) 704. PHY 702 and. MAC 704 may be HEW compliant layers and may also be compliant with one or more legacy IEEE 802.11 standards. PHY 702 may be arranged to transmit HEW frames, such as HEW frame (FIG. 4). HEW device 700 may also include other processing circuitry 706 and memory 708 configured to perform the various operations described herein.

In accordance with some embodiments, the MAC 704 may be arranged to contend for a wireless medium during a contention period to receive control of the medium for the HEW control period and configure an HEW frame. The PHY 702 may be arranged to transmit the HEW frame as discussed above. The PHY 702 may also be arranged to receive an HEW frame from HEW stations. MAC 704 may also be arranged to perform transmitting and receiving operations through the PHY 702. The PHY 702 may include circuitry for modulation/demodulation, upconversion/downconversion, filtering, amplification, etc. In some embodiments, the processing circuitry 706 may include one or more processors. In some embodiments, two or more antennas may be coupled to the physical layer circuitry arranged for sending and receiving signals including transmission of the HEW frame. The memory 708 may be store information for configuring the processing circuitry 706 to perform operations for configuring and transmitting HEW frames and performing the various operations described herein.

In some embodiments, the HEW device 700 may be configured to communicate using OFDM communication signals over a multicarrier communication channel. In some embodiments, HEW device 700 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the invention is not limited in this respect as they may also be suitable to transmit and/or receive communications in accordance with other techniques and standards. In some other embodiments, HEW device 700 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, HEW device 700 may be part of a portable wireless communication device, such as a personal digital assistant (PDA), a laptop or portable computer with wireless communication capability, a web tablet, a wireless telephone or smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, HEW device 700 may include one or more of a keyboard, a display, a non-volatile memory port, multiple antennas, a graphics processor, an application processor, speakers, and other mobile device elements. The display may be an LCD screen including a touch screen.

The antennas of HEW device 700 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result between each of antennas and the antennas of a transmitting station.

Although HEW device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of HEW device 700 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In some embodiments, when HEW device 700 is configured to operate as an HEW station 104 (FIG. 1), the HEW device's receiver may be arranged to receive, during an initial portion of an HEW control period, a master-sync transmission that includes a single multi-device HEW preamble this is arranged to signal and identify a plurality of data fields for a plurality of HEW stations 104 that are scheduled during the HEW control period. The receiver may also be configured to determine an initial channel estimate based on one or more training fields (e.g., a number of LTFs) received within the multi-device HEW preamble. The receiver may also be configured to receive an identified one of the data fields within the HEW control period and demodulate data from the identified data field using the updated channel estimate.

In some embodiments, the master station 102 may allocate resources to scheduled HEW stations 104 for use during the HEW control period based on criteria that includes one or more of signal-to-noise ratio (SNR), configuration, throughput, amount of data to send, a fairness criteria and quality-of-service requirements. The master station 102 may determine whether stations are HEW stations 104 or legacy stations 106 at the time of association with the master station 102 through a capability exchange. In some embodiments, the master station 102 may notify HEW stations 104 that the control period is to be used for communications in accordance with a multiple-access technique. In some embodiments, the master station 102 may use the control period when there is congestion and communicate in accordance with conventional Wi-Fi techniques (e.g., CSMA/CA) otherwise. In some embodiments, mapping of a control signal may be performed at the beginning of the transmission to list devices that are to communicate during the control period, although the scope of the embodiments is not limited in this respect.

Figure 8:
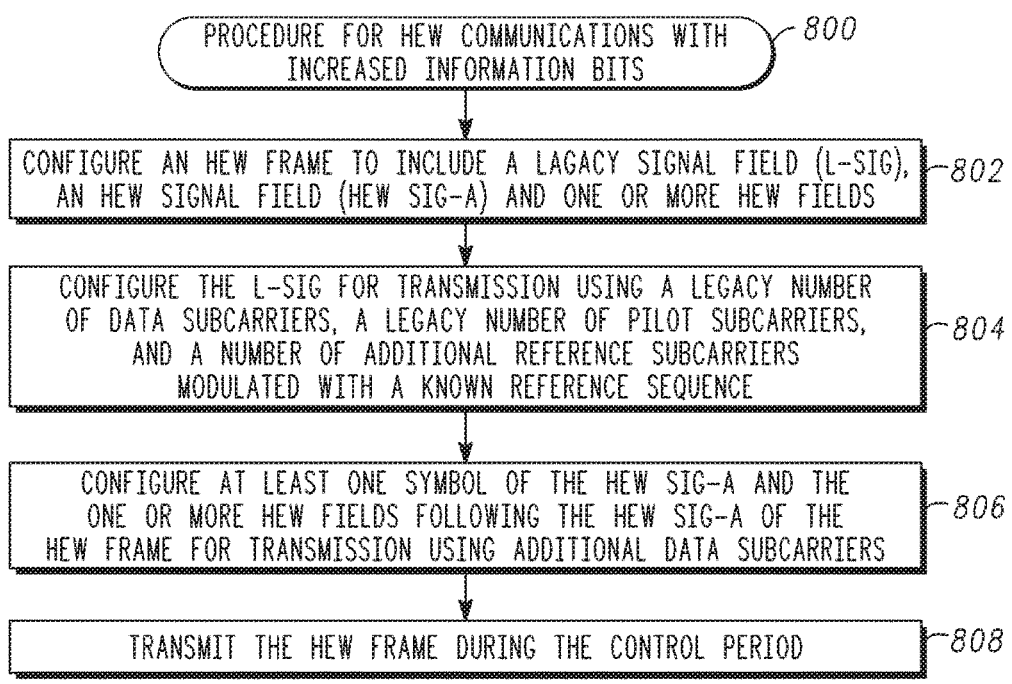
FIG. 8 illustrates a procedure for HEW communications with increased information bits in accordance with some embodiments.

FIG. 8 illustrates a procedure for HEW communications with increased information bits in accordance with some embodiments. Procedure 800 may be performed by access point configured to operate as a master station, such as master station 102 (FIG. 1) for HEW communications. In operation 802, the method may include configuring an HEW frame to include a legacy signal field (L-SIG), an HEW signal field (HEW SIG-A) following the L-SIG, and one or more HEW fields following the HEW SIG-A. In operation 804, the method may include configuring the L-SIG for transmission using a legacy number of data subcarriers, a legacy number of pilot subcarriers, and a number of additional reference subcarriers modulated with a known reference sequence. In operation 806, the method may include configuring at least one symbol of the HEW SIG-A and the one or more HEW fields following the HEW SIG-A of the HEW frame for transmission using additional data subcarriers. The additional data subcarriers may correspond to the additional reference subcarriers of the L-SIG. In operation 808, the method may include transmitting the configured HEW frame. The frame may be transmitted during the HEW control period during which OFDMA communications may take place.

In one example, an access point is configured to operate as a master station for high-efficiency WLAN (HEW) communications. The access point comprises hardware processing circuitry to configure an HEW frame to include a legacy signal field (L-SIG), an HEW signal field (HEW SIG-A) following the L-SIG, and one or more HEW fields following the HEW SIG-A. In this example, the L-SIG is configured for transmission using a legacy number of data subcarriers, a legacy number of pilot subcarriers, and a number of additional reference subcarriers modulated with a known reference sequence. In this example, at least one symbol of the HEW SIG-A and the one or more HEW fields following the HEW SIG-A of the HEW frame are configured for transmission using additional data subcarriers, the additional data subcarriers corresponding to the additional reference subcarriers of the L-SIG.

In another example, for a 20 MHz channel, the legacy number of data subcarriers is forty-eight, the legacy number of pilot subcarriers is four, and the number of additional subcarriers modulated with a known reference sequence is four for a total of sixty-four subcarriers, including null subcarriers. In this example, a number of data subcarriers of an HEW data field following the HEW SIG-A is fifty-two.

In another example, the HEW frame further includes a legacy long-training field (L-LTF) preceding the L-SIG. In this example, the hardware processing circuitry is configured to scale a per-subcarrier power allocation the L-SIG by a factor of 56/52.

In another example, for a 20 MHz channel, the pilot subcarriers are located at positions −21, −7, 7, 21 with respect to a DC subcarrier and the additional reference subcarriers are located at positions −28, −27, 27, 28 with respect to the DC subcarrier.

In another example, the known reference sequence that is modulated on the additional reference subcarriers of the L-SIG is to be used for channel estimation by a receiving HEW station to allow the receiving HEW station to demodulate and decode the additional data subcarriers of the HEW SIG-A and the additional data subcarriers of the one or more HEW fields following the HEW SIG-A.

In another example, the hardware processing circuitry is configured to scale a per-subcarrier power allocation the L-SIG by a factor of B/A, where A is the legacy number of data subcarriers plus the legacy number of pilot subcarriers, and B is the legacy number of data subcarriers plus the legacy number of pilot subcarriers plus the number of additional subcarriers.

In another example, one or more HEW fields following the HEW SIG-A of the HEW frame include: an HEW data field; and an HEW schedule field (HEW-SCH) preceding the data field that includes scheduling information for one or more HEW stations that are scheduled to communication with the access point during the data field in accordance with a scheduled orthogonal-frequency divisional multiple access (OFDMA) technique.

In another example, the HEW SIG-A comprises at least a first symbol (HEW SIG-A1) and a second symbol (HEW SIG-A2). In this example, information bits carried by HEW SIG-A1 are mapped on the legacy data subcarriers and pilot subcarriers of the HEW SIG-A1 are mapped on the legacy pilot subcarriers. In this example, the additional reference subcarriers of the HEW SIG-A1 are modulated with a known reference sequence. In this example, information bits carried by HEW SIG-A2 are mapped on the data subcarriers and the additional reference subcarriers. In this example, pilot subcarriers of the HEW SIG-A2 are mapped on the legacy pilot subcarriers.

In another example, when the access point is operating as a master station, the access point is arranged to: contend for a wireless medium during a contention period to receive control of the medium for the HEW control period; and transmit the HEW frame during the HEW control period, wherein during the HEW control period, the master station has exclusive use of the wireless medium for communication with the scheduled HEW stations in accordance with a non-contention based multiple-access technique.

In another example, when the access point is operating as a master station, the access point is arranged to either: transmit, within the HEW control period, downlink data multiplexed to each of a plurality of scheduled HEW stations, the downlink data from each scheduled station corresponding to one link and comprising one or more streams; or receive, within the HEW control period, uplink data multiplexed from the plurality of scheduled HEW stations, the uplink data from each scheduled station corresponding to one link and comprising one or more streams, and include the number of LTFs in an LTF portion of an HEW preamble; include an HEW schedule field (HEW-SCH) to follow the LTF portion; and configure the HEW frame to include a legacy preamble to precede the HEW preamble.

In another example, a communication station is configured for high-efficiency WLAN (HEW) communications, the station comprising hardware processing circuitry configured to receive an HEW frame that includes at least a legacy signal field (L-SIG), an HEW signal field (HEW SIG-A) following the L-SIG, and one or more HEW fields following the HEW SIG-A. In this example, the L-SIG uses a legacy number of data subcarriers, a legacy number of pilot subcarriers, and a number of additional reference subcarriers modulated with a known reference sequence. In this example, at least one symbol of the HEW SIG-A and the one or more HEW fields following the HEW SIG-A of the HEW frame are configured for transmission using additional data subcarriers, the additional data subcarriers corresponding to the additional reference subcarriers of the L-SIG. In this example, the access point may decode the data subcarriers of the L-SIG to determine length and rate information, calculate channel estimates for the additional reference subcarriers of the L-SIG from the known reference sequence, and utilize the channel estimates to decode the additional data subcarriers of the at least one symbol of HEW SIG-A and the one or more HEW fields following the HEW SIG-A.

In another example, the communication station may further be configured to refrain from decoding the additional reference subcarriers of the L-SIG.

In another example, the communication station is configured to utilize channel estimates determined from a legacy training field to decode data subcarriers of the HEW SIG-A, the data subcarriers of the HEW SIG-A corresponding to the data subcarriers of the L-SIG.

In another example, the communication station may further be configured to determine whether a received frame is an HEW frame or a legacy frame based on whether a value in the length field of the L-SIG is divisible three or based on a phase rotation applied to BPSK modulation of first and second symbols of a subsequent signal field.

In another example, the HEW SIG-A comprises at least a first symbol (HEW SIG-A1) and a second symbol (HEW SIG-A2). In this example, information bits carried by HEW SIG-A1 are mapped on the legacy data subcarriers, pilot subcarriers of the HEW SIG-A1 are mapped on the legacy pilot subcarriers. In this example, the additional reference subcarriers of the HEW SIG-A1 are modulated with a known reference sequence. In this example, information bits carried by HEW SIG-A2 are mapped on the data subcarriers and the additional reference subcarriers. In this example, pilot subcarriers of the HEW SIG-A2 are mapped on the legacy pilot subcarriers. In this example, the communication station is configured to utilize the additional reference subcarriers of the HEW SIG-A1 and the additional reference subcarriers of the L-SIG for channel estimation; and decode the HEW SIG-A2 based on channel estimates obtained from an L-LTF, the L-SIG and the HEW SIG-A1.

In another example, a method for high-efficiency WLAN (HEW) communications comprises configuring an HEW frame to include a legacy signal field (L-SIG), an HEW signal field (HEW SIG-A) following the L-SIG, and one or more HEW fields following the HEW SIG-A; and
wherein the L-SIG is configured for transmission using a legacy number of data subcarriers, a legacy number of pilot subcarriers, and a number of additional reference subcarriers modulated with a known reference sequence, and
wherein at least one symbol of the HEW SIG-A and the one or more HEW fields following the HEW SIG-A of the HEW frame are configured for transmission using additional data subcarriers, the additional data subcarriers corresponding to the additional reference subcarriers of the L-SIG.

In another example, for a 20 MHz channel, the legacy number of data subcarriers is forty-eight, the legacy number of pilot subcarriers is four, and the number of additional subcarriers modulated with a known reference sequence is four for a total of sixty-four subcarriers including null subcarriers. In this example, a number of data subcarriers of an HEW data field following the HEW SIG-A is fifty-two. In this example, for a 20 MHz channel, the pilot subcarriers are located at positions −21, −7, 7, 21 with respect to a DC subcarrier and the additional reference subcarriers are located at positions −28, −27, 27, 28 with respect to the DC subcarrier.

In another example, the known reference sequence that is modulated on the additional reference subcarriers of the L-SIG is to be used for channel estimation by a receiving HEW station to allow the receiving HEW station to demodulate and decode the additional data subcarriers of the HEW SIG-A and the additional data subcarriers of the one or more HEW fields following the HEW SIG-A.

In another example, a non-transitory computer-readable storage medium that stores instructions for execution by one or more processors of an access point to perform operations for high-efficiency WLAN (HEW) communications is provided . . . In this example, the operations to configure the access point to: configure an HEW frame to include a legacy signal field (L-SIG), an HEW signal field (HEW SIG-A) following the L-SIG and one or more HEW fields following the HEW SIG-A. In this example, the L-SIG is configured for transmission using a legacy number of data subcarriers, a legacy number of pilot subcarriers, and a number of additional reference subcarriers modulated with a known reference sequence. In this example, at least one symbol of the HEW SIG-A and the one or more HEW fields following the HEW SIG-A of the HEW frame are configured for transmission using additional data subcarriers, the additional data subcarriers corresponding to the additional reference subcarriers of the L-SIG.

In another example, the known reference sequence that is modulated on the additional reference subcarriers of the L-SIG is to be used for channel estimation by a receiving HEW station to allow the receiving HEW station to demodulate and decode the additional data subcarriers of the HEW SIG-A and the additional data subcarriers of the one or more HEW fields following the HEW SIG-A.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A wireless apparatus configured to operate as a high-efficiency (HE) station, the apparatus comprising:
an interface; and
processing circuitry, coupled with the interface, and configured to:
decode a legacy long training field (L-LTF) of an HE data unit, the L-LTF comprising a legacy number of reference subcarriers;
decode a legacy signal field (L-SIG) of the HE data unit, the L-SIG comprising a legacy number of data subcarriers, and four reference subcarriers; and
decode a HE-signal field (HE-SIG-A) of the HE data unit, the HE-SIG-A comprising a total number of data subcarriers including four data subcarriers corresponding in frequency to the four reference subcarriers of the L-SIG,
wherein the four reference subcarriers of the L-SIG are modulated with a known reference sequence.

2. The apparatus of claim 1, wherein the L-LTF precedes the L-SIG, and
wherein the processing circuitry is further configured to decode the L-LTF prior to decoding the L-SIG.

3. The apparatus of claim 1 wherein the four reference subcarriers or the L-SIG comprise two subcarriers at each edge a 20 MHz channel.

4. The apparatus of claim 1 wherein the known reference sequence is stored in a memory, and wherein the processing circuitry is configured to access the memory using the interface.

5. The apparatus of claim 4, wherein for the 20 MHz channel:
the legacy number of reference subcarriers of the L-LTF is forty-eight,
the total number of data subcarriers included in the L-SIG is forty-eight, and
the total number of data subcarriers included in the HE-SIG-A is fifty-two.

6. The apparatus of claim 5, wherein for the 20 MHz channel:
the L-LTF includes four pilot subcarriers and the forty-eight reference subcarriers for a total of fifty-two subcarriers, the L-SIG includes four pilot subcarriers, the forty-eight data subcarriers and the four reference subcarriers, for a total of fifty-six subcarriers, and
the HE-SIG-A further includes four pilot subcarriers and the fifty-two data subcarriers for a total of fifty-six subcarriers.

7. The apparatus of claim 5 wherein the processing circuitry is configured to:
determine a first channel estimate for subcarrier frequencies using the forty-eight reference subcarriers of the L-LTF,
determine a second channel estimate for subcarrier frequencies using the four reference subcarriers of the L-SIG; and
demodulate, using the first and second channel estimates, the fifty-two data subcarriers of the HE-SIG-A.

8. The apparatus of claim 2, wherein in the HE data unit is a downlink HE data unit received from a master station,
wherein the processing circuitry is configured to generate an uplink HE data unit in response to receipt of the downlink HE data unit, the uplink HE data unit configured to include a L-SIG comprising the four reference subcarriers and an HE-SIG-A comprising the total number of data subcarriers including the four data subcarriers corresponding in frequency to the four reference subcarriers of the L-SIG, and
wherein receipt of the downlink HE data unit is configured to trigger the processing circuitry to generate the uplink HE data unit for transmission to the master station within a transmission opportunity (TXOP) obtained by the master station.

9. The apparatus of claim 2, wherein the HE STA is configured to operate as a master station,
wherein the HE data unit is an uplink HE data unit received in response to transmission of a downlink HE data unit by the master station, the downlink HE data unit configured to include a L-SIG comprising the four reference subcarriers and an HE-SIG-A comprising the total number of data subcarriers including the four data subcarriers corresponding in frequency to the four reference subcarriers of the L-SIG,
wherein the uplink HE data unit is received within a transmission opportunity (TXOP) obtained by the master station, and
wherein transmission of the downlink HE data unit is configured to trigger transmission of the uplink HE data unit to the master station within the TXOP.

10. The apparatus of claim 1 wherein the HE data unit is received on a plurality of 20 MHz channels,
wherein the processing circuitry is further configured to:
decode the L-SIG of HE data unit, the L-SIG comprising four reference subcarriers for each 20 MHz channel, the four reference subcarriers comprising two subcarriers at each edge of each 20 MHz channel; and
decode the HE-SIG-A of the HE data unit, the HE-SIG-A comprising the total number of data subcarriers including four data subcarriers corresponding in frequency to the four reference subcarriers of the L-SIG, for each 20 MHz channel.

11. The apparatus of claim 1 further comprising:
transceiver circuitry and one or more antenna coupled to the transceiver circuitry.

12. A wireless apparatus configured to operate as a high-efficiency (HE) station, the apparatus comprising:
an interface; and
processing circuitry, coupled with the interface, and configured to:
decode a legacy long training field (L-LTF) of an HE data unit, the L-LTF comprising a legacy number of reference subcarriers;
decode a legacy signal field (L-SIG) of the HE data unit, the L-SIG comprising a legacy number of data subcarriers, and four reference subcarriers; and
decode a HE-signal field (HE-SIG-A) of the HE data unit, the HE-SIG-A comprising a total number of data subcarriers including four data subcarriers corresponding in frequency to the four reference subcarriers of the L-SIG,
wherein the four reference subcarriers of the L-SIG are modulated with a known reference sequence, and
wherein the HE data unit further comprises a repetition of the L-SIG immediately following the L-SIG and prior to the HE-SIG-A.

13. A non-transitory computer-readable storage medium that stores instructions for execution by processing circuitry of a wireless device configured for operation as a high-efficiency (HE) station (HE-STA), the instructions to configure the device to perform operations to:
decode a legacy long training field (L-LTF) of an HE data unit, the L-LTF comprising a legacy number of reference subcarriers;
decode a legacy signal field (L-SIG) of the HE data unit, the L-SIG comprising four reference subcarriers and a legacy number of data subcarriers; and
decode a HE-signal field (HE-SIG-A) of the HE data unit, the HE-SIG-A comprising a total number of data subcarriers including four data subcarriers corresponding in frequency to the four reference subcarriers of the L-SIG,
wherein the four reference subcarriers of the L-SIG are modulated with a known reference sequence.

14. The non-transitory computer-readable storage medium of claim 13, wherein the L-LIF precedes the L-SIG, and
wherein the processing circuitry is further configured to decode the L-LTF prior to decoding the L-SIG.

15. The non-transitory computer-readable storage medium of claim 13, wherein the four reference subcarriers or the L-SIG comprise two subcarriers at each edge a 20 MHz channel.

16. The non-transitory computer-readable storage medium of claim 13, wherein for the 20 MHz channel:
the legacy number of reference subcarriers of the L-LIF is forty-eight,
the total number of data subcarriers included in the L-SIG is forty-eight, and
the total number of data subcarriers included in the HE-SIG-A is fifty-two.

17. A wireless apparatus configured for operation as a high-efficiency (HE) station (HE-STA), the apparatus comprising:
memory to store a known reference sequence; and
processing circuitry to generate a HE data unit for transmission on a 20 MHz channel, the HE data unit comprising a plurality of fields,
wherein to generate the HE data unit, the processing circuitry is configured to:
encode a legacy long training field (L-LTF) of the HE data unit, the L-LTF comprising a legacy number of reference subcarriers;
encode a legacy signal field (L-SIG) of the HE data unit, the L-SIG to follow the L-LIF, the L-SIG comprising four reference subcarriers and a legacy number of data subcarriers, the four reference subcarriers of the L-SIG being modulated with the known reference sequence;
encode a HE-signal field (HE-SIG-A) of the HE data unit, the HE-SIG-A comprising a total number of data subcarriers including four data subcarriers corresponding in frequency to the four reference subcarriers of the L-SIG; and
configure a subcarrier power allocation of the subcarriers of the L-SIG and the HE-SIG-A so that the L-SIG has a same total power as the L-LTF and that the HE-SIG-A has the same total power as the L-LTF, for transmission of the L-SIG and the HE-SIG-A on the 20 MHz channel.

18. The apparatus of claim 17 wherein the processing circuitry is to configure transceiver circuitry to transmit the HE data unit, including the L-LTF, the L-SIG, and the HE-SIGA, on each of a plurality of 20 MHz channels,
wherein the L-LTF, the L-SIG, and the HE-SIG-A are each configured to be transmitted at the same total power.

19. The apparatus of claim 18 wherein the processing circuitry is configured to:
scale the subcarrier power allocation of each of the subcarriers of the L-SIG by a ratio of the legacy number of subcarriers of the L-LTF to a total number of subcarriers of the L-SIG, and
scale the subcarrier power allocation of each of the subcarriers of the HE-SIG-A by a ratio of the legacy number of subcarriers of the L-LTF to a total number of subcarriers of the HE-SIG-A.

20. The apparatus of claim 17 wherein the four reference subcarriers or the L-SIG comprise two subcarriers at an edge a 20 MHz channel.

* * * * *

UNITED STATES PATENT AND TRADEMARK OFFICE
CERTIFICATE OF CORRECTION

PATENT NO. : 10,177,888 B2  
APPLICATION NO. : 15/263864  
DATED : January 8, 2019  
INVENTOR(S) : Azizi et al.

Page 1 of 1

It is certified that error appears in the above-identified patent and that said Letters Patent is hereby corrected as shown below:

On the Title Page

On page 6, in Column 1, item (56), under "Other Publications", Line 54, delete "Mechansim-MAC" and insert --Mechanism-MAC-- therefor In the Claims In Column 17, Line 34, in Claim 7, delete "L-LTF," and insert --L-LTF;-- therefor In Column 18, Line 36, in Claim 12, delete "suhcarriers" and insert --subcarriers-- therefor In Column 18, Line 60, in Claim 14, delete "L-LIF" and insert --L-LTF-- therefor In Column 19, Line 3, in Claim 16, delete "L-LIF" and insert --L-LTF-- therefor In Column 19, Line 21, in Claim 17, delete "L-LIF," and insert --L-LTF,-- therefor Signed and Sealed this  
Seventh Day of April, 2020

Andrei Iancu  
*Director of the United States Patent and Trademark Office*